United States Patent [19]

Bourg et al.

[11] Patent Number: 4,734,931
[45] Date of Patent: Mar. 29, 1988

[54] INTEGRATED CALLING DIRECTORY

[75] Inventors: James W. Bourg, Monmouth Beach, N.J.; Thomas J. Tierney, Jr., Aurora, Colo.

[73] Assignee: American Telephone and Telegraph Company and AT&T Information Systems Inc., Holmdel, N.J.

[21] Appl. No.: 842,682

[22] Filed: Mar. 21, 1986

[51] Int. Cl.[4] ............................................ H04M 11/00
[52] U.S. Cl. ...................................... 379/93; 379/94; 379/96; 379/216
[58] Field of Search ...................... 379/84, 88, 89, 93, 379/94, 96, 98, 213, 216

[56] References Cited

U.S. PATENT DOCUMENTS

| | | | |
|---|---|---|---|
| 3,500,327 | 3/1970 | Belcher et al. | 379/96 X |
| 3,821,705 | 6/1974 | Chertok et al. | 379/98 |
| 4,112,258 | 9/1978 | Alles | 370/58 |
| 4,341,929 | 7/1982 | Alexander et al. | 379/359 |
| 4,503,288 | 3/1985 | Kessler | 379/96 X |
| 4,534,023 | 8/1985 | Peck et al. | 370/58 |
| 4,535,198 | 8/1985 | Squicciarini | 179/2 DP |
| 4,608,460 | 8/1986 | Carter et al. | 379/89 X |
| 4,633,041 | 12/1986 | Boivie et al. | 379/354 |
| 4,649,533 | 3/1987 | Chorley et al. | 379/94 X |
| 4,649,563 | 3/1987 | Riskin | 379/88 X |
| 4,653,085 | 3/1987 | Chen et al. | 379/94 |

FOREIGN PATENT DOCUMENTS 0240295 11/1985 Japan .................................. 379/269

OTHER PUBLICATIONS

Rabiner, "Digital Techniques for Computer Voice Response: Implementations and Applications", Proceedings of the IEEE, vol. 64, No. 4, Apr. 1976.

N. Accarino et al, entitled, "Frame-Mode Customer Access to Local Integrated Voice and Data Digital Network", published in the Conference Report of the IEEE 1979 International Conference on Communications, pp. 38.5.1–38.5.7.

Primary Examiner—Jin F. Ng
Assistant Examiner—Matthew F. Connors
Attorney, Agent, or Firm—James M. Graziano; John C. Moran

[57] ABSTRACT

The integrated calling directory of the present invention eliminates the disadvantages of prior call directory arrangements by providing a software system which runs on a personal computer to automate the call directory and call origination function. The personal computer is interposed between an individual's telephone station set and the business communication system port circuit associated with the individual's telephone station set. The calling directory software both contains the individual's personal directory entries and has access to directory entries in the centralized business communication system data base which resides on an adjunct processor. These directory entries all contain called party identification data which includes information such as an individual's name, room number, electronic mail address, telephone number, type of terminal equipment associated with the called party, job title, etc.

13 Claims, 13 Drawing Figures

FIG. 8
DCP FRAME FORMAT

| F | S | $I_1$ | $I_2$ |
|---|---|---|---|
| 3 BITS | 1 BIT | 8 BITS | 8 BITS |

FIG. 9
HDLC FRAME FORMAT

| FLAG 01111110 | ADDRESS | CONTROL | I INFORMATION | CHECK SEQUENCE | FLAG 01111110 |
|---|---|---|---|---|---|
| 1 BYTE | 1 BYTE | 1 BYTE | 0-16 BYTES | 2 BYTES | 1 BYTE |

FIG. 11

```
F1-4479   idle         F2-Call
F3-4479   idle         F4-Conf
F5-4479   idle         F6-Trans
F7-4479   idle         F8-Hold
F9-6248   active       F0-Drop AF1-Leave Word         : SF1-Arthur, B. A.   SF2-audixlogin
    Calling
AF3-Send All           : SF3-Auer, O. L.     SF4-Baver, D. K.
    Calls
AF5-Call               : SF5-Baom, S. B.     SF6-Bekman, S. A.
    Forward
AF7-Leave Word         : SF7-Berry, R. D.    SF8-Bush, S. L.
    Calling Cancel
AF9-Last Num           : SF9-Carver, J. W.   SF0-Cashel, W. C.
    Dialed Name: _____   Group ID: ____
1=Personal   2=CMA Proj   3=Beta Users   4=Group 4   5=Group 5
6=Group 6    7=Group 6    8=Group 8      9=Group 9   0=Group 0
FIND:  Search  Clear  AllDir  Phone  Message  Log  EditDir  Other   *DCA*
```

FIG. 13

```
F1-4479   idle
F3-4479   idle              F2-Call
F5-4479   idle              F4-Conf
F7-4479   idle              F6-Trans
F9-6248   d active          F8-Hold
                            F0-Drop
MMMMMMMMMMMMMMMMMMMMMMMMMMMMMMMMMMMMMMMMMMMMMMMM Name: _____

Group ID: _____    Voice call (Y/N)? y

Number: _____         Dialing mnemonic: _____

Address: _____        _____

Electronic mail address: _____

Comment: _____

EDITDIR:  Save  Clear  Phone  Message  Log  Find  Help                *DCA*
```

1311, 1312, 1313

INTEGRATED CALLING DIRECTORY

CROSS-REFERENCE TO RELATED APPLICATIONS

The following U.S. applications, which are assigned to the same assignee as the instant application and filed concurrently therewith, have related subject matter;

(1) "Automated Message Chronicling System", Ser. No. 842,601, filed Mar. 21, 1986 by J. W. Bourg.

(2) The Personal Computer—As An Interface Between A Telephone Station Set and A Business Communication System, Ser. No. 842,685, filed Mar. 21, 1986 by D. C. Gibbs and N. W. Petty.

FIELD OF THE INVENTION

This invention relates to call directories and, in particular, to an integrated calling directory that resides on a user's personal computer. The personal computer is connected to a business communication system. The integrated calling directory has access to both directory information stored in the memory of the personal computer and centralized directory entries which are stored on the business communication system.

BACKGROUND OF THE INVENTION

Existing call directories are data bases generally found on an adjunct processor associated with the business communication system, which data base contains entries identifying an individual's name, address, organization, telephone number and other pertinent information. This centralized data base is accessible in the dial-up mode by subscribers who are served by the business communication system and by directory assistance operators who generally have their terminals hard-wired to an adjunct processor which contains the data base. An individual who wishes to obtain directory information from the data base must use one of these terminal access points to query the data base.

Another call directory arrangement is found on personal computers where an individual can create their own personal call directory data base on their personal computer. This data base contains entries similar to those contained in the centralized call directory data base. An additional capability is provided by the personal computer wherein the personal computer can output an identified individual's telephone number as dial pulse or Touch-Tone signals to originate a telephone call through the business communication system to the identified individual. In similar fashion, files resident on the personal computer can be electronically transferred to an identified destination by the personal computer, under control of the subscriber, by the subscriber attaching an electronic mail address to the file and outputting same over the telephone lines through the business communication system to the identified destination.

A significant disadvantage of these call directory arrangements is that the subscriber must perform a number of operations to transmit information to an identified individual or destination. The subscriber must access the call directory, input the indentified individual's name, receive the entry from the call directory identifying the called party's room number, telephone number or electronic mail address. The subscriber must then take the received information and input it to their terminal or personal computer and indicate to the personal computer that this information must be used to originate a call connection or data transfer to the identified called party. This sequence of operations is time consuming and error prone.

SUMMARY OF THE INVENTION

The integrated calling directory of the present invention eliminates the disadvantages of prior call directory arrangements by providing a software system which runs on a personal computer to automate the call directory and call origination function. The personal computer is interposed between an individual's telephone station set and the business communication system port circuit associated with the individual's telephone station set. The calling directory software both contains the individual's personal directory entries and has access to directory entries in the centralized business communication system data base which resides on an adjunct processor. These directory entries all contain called party identification data which includes information such as an individual's name, room number, electronic mail address, telephone number, type of terminal equipment associated with the called party, job title, etc.

The integrated calling directory software responds to a message created by the subscriber on the personal computer by automatically analyzing the format of the message so created and certain message-dependent characteristics of the identified destination, such as type of terminal equipment. The calling directory software automatically selects the message transmission medium, accesses the appropriate directory entry to create the message header appropriate for the media selected by the calling directory software, then transmits the completed message to the designated destination using the medium selected. The calling directory software can obtain the calling directory information either from an individualized data base residing on the personal computer or the centralized data base resident on the adjunct processor associated with the business communication system. The calling directory software automatically accesses the appropriate one of these two data bases to obtain the identification of the called party's destination description.

The calling directory software of the present invention automates the entire message transmisson function and eliminates the need for the subscriber to sequentially access a call directory then input the selected destination address into the personal computer and perform a call origination function. The integrated calling directory software combines all of these functions into a simple single feature activation by the subscriber. This combination eliminates a potential for improper or incorrect data entry and the time consuming sequential operations of the prior art call directory arrangements.

BREIF DESCRIPTION OF THE DRAWINGS

FIG. 7 illustrates the method of arranging FIGS. 4 through 6;

FIG. 8 depicts the details of the DCP signaling protocol;

FIG. 9 depicts the details of the HDLC message frame; and

FIG. 11 illustrates a typical call management display on the screen of the personal computer;

FIG. 13 illustrates a typical directory entry creation display on the screen of the personal computer.

DETAILED DESCRIPTION

Figure 1:
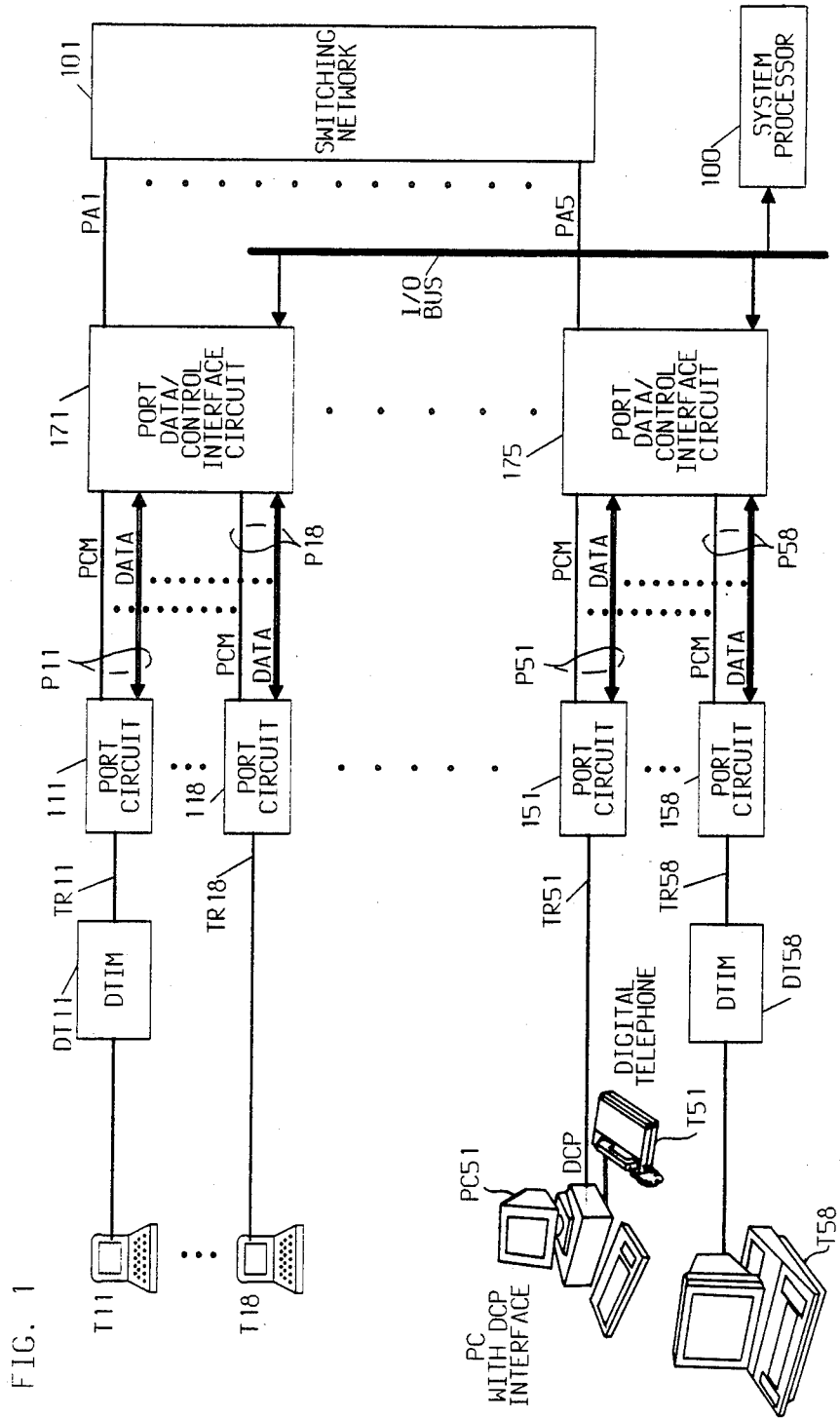
FIG. 1 illustrates the subject business communication system and the various devices connected thereto in block diagram form.

The business communication system of this invention is illustrated in FIG. 1. This system includes a plurality of terminal equipment T11–T58 each of which is associated with a respective one of port circuits 111–158. This terminal equipment includes telephone station sets as well as digital terminal devices and computer facilities. A switching network 101, which comprises a time slot interchange circuit of the type illustrated in U.S. Pat. No. 4,112,258, issued to H. G. Alles, Sept. 5, 1978, is connected to a number of port data/control interface circuits 171–175. Each port/data control interface circuit (e.g. 171) shown in FIG. 1 serves eight port circuits (111–118) and functions to interface these port circuits with switching network 101 as well as system processor 100. Switching network 101 operates under control of system processor 100 and establishes communication connections among the terminal equipment by interconnecting the associated port circuits 111–158.

Figure 2:
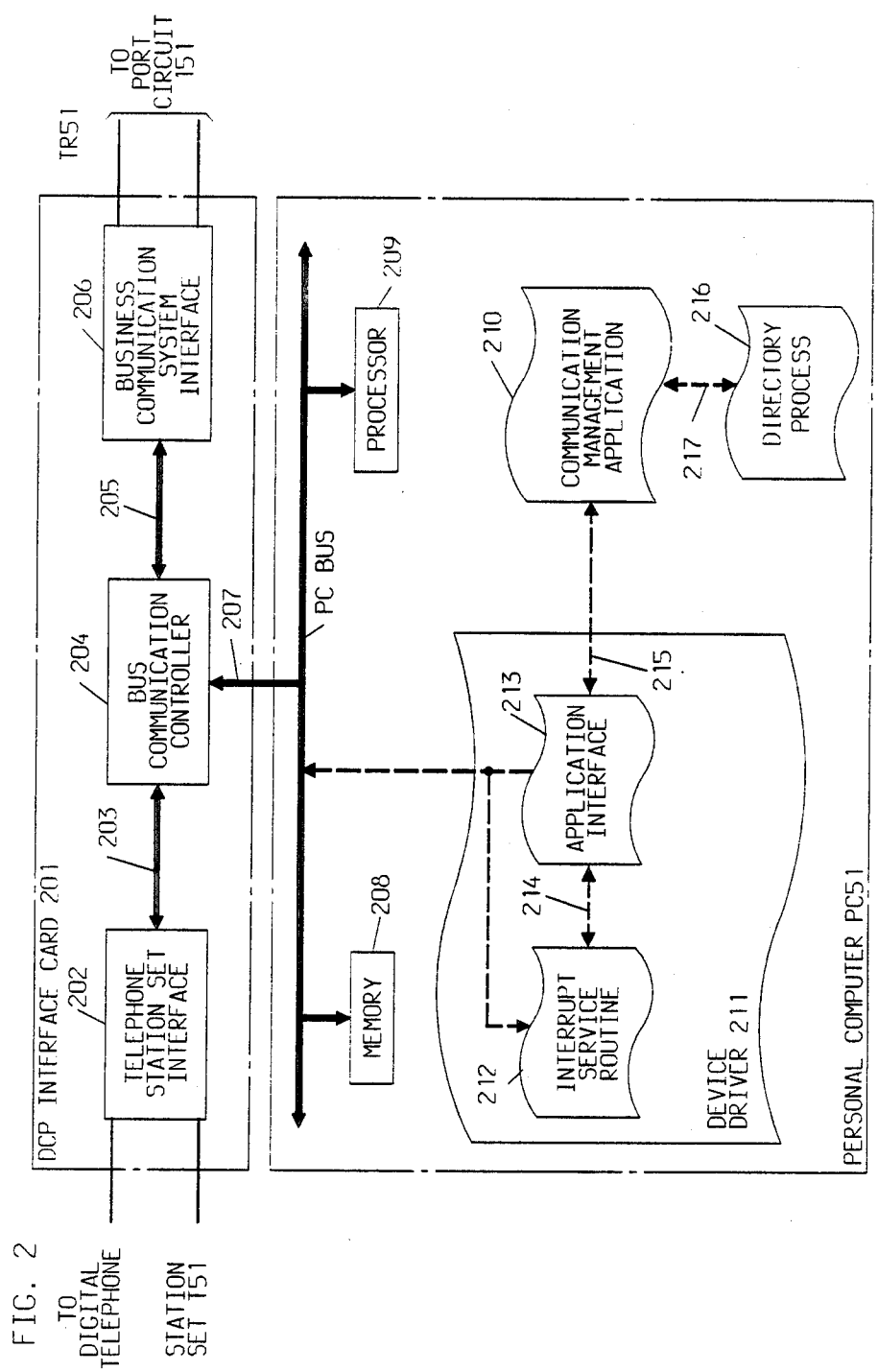
FIG. 2 illustrates the interface apparatus of the subject invention in block diagram form.

The terminal equipment connected to port circuit 151 consists of the subject interface arrangement embodied in personal computer PC51 which is equipped with a DCP interface card and a digital telephone station set T51. Personal computer PC51 is interposed between port circuit 151 and digital telephone station set T51 and serves to provide communication services to digital telephone station set T51. This is accomplished by the use of DCP interface card 201 shown in block diagram form in FIG. 2.

DCP INTERFACE CARD

DCP interface card 201 is plugged into one of the expansion slots of personal computer PC51, where personal computer PC51 can be, for example, an AT&T PC6300 computer. DCP interface card 201 consists of two interface devices, telephone station set interface 202 and business communication system interface 206, which interconnect personal computer PC51 to digital telephone station set T51 and port circuit 151 respectively. Leads 203 and 205 connect telephone station set interface 202 and business communication system interface 206 respectively to bus communication controller 204.

DCP interface card 201 receives all transmissions from port circuit 151 in business communication system interface 206 via communication leads TR51. Bus communication controller 204 receives an interrupt signal from business communication system interface 206 via leads 205 and reads the transmissions from port circuit 151 stored in business communication system interface 206. Bus communication controller 204 responds to these transmissions by generating an interrupt signal on PC BUS 207 to personal computer PC51. Personal computer PC51 serves the interrupt by reading the transmission stored in bus communication controller 204 via PC BUS 207, and storing the transmission in memory 208. Personal computer PC51 contains communication management application 210 to process the received transmission from port circuit 151. Device drivers 211 interfaces communication management application 210 with DCP interface card 201. Device drivers 211 contains two basic components: interrupt service routine 212 and application interface process 213. The functions of device drivers 211 are: process interrupts from DCP interface card 201; buffer and transfer data between DCP interface card 201 and communciation management application 210; provide a simple interface to communication management application 210 for basic call setup and data transfer handle data call setup procedures with the business communication system as will be discussed below.

If the processing of the received transmission requires a change in the status of digital telephone station set T51, processor 209 transmits control signals to bus communication controller 204 via PC BUS 207. These control signals are forwarded by bus communication controller 204 to digital telephone station set T51 via leads 203 and telephone station set interface 202.

Transmissions from digital telephone station set T51 to port circuit 151 are handled in similar fashion, with the above described process being reversed. The operation of DCP interface card 201 and communication management application 210 is described in further detail below in the description of FIG. 3. To provide an explanation of the DCP signaling protocol, the following description discusses a typical port circuit and the functions performed therein.

TERMINAL EQUIPMENT

The standard digital terminal T11 generates an RS232 signal output which has a very limited transmission range. A digital terminal interface module (e.g.-DT11) is used to convert the RS232 signals output by digital terminal T11 to alternate bipolar modulated code signals which can be transmitted a significant distance over communication leads TR11 to the port circuits 111 of the business communication system. The digital terminal interface module DT11 is either an integral part of the digital terminal or connected between the existing digital terminal T11 and the associated communication leads TR11. This digital terminal interface module is disclosed in detail in U.S. Pat. No. 4,535,198 issued Aug. 13, 1985, to G. N. Squicciarini.

In addition to this signal conversion, digital terminal interface module DT11 uses a particular message frame format (DCP) to effect data transmission between port circuits such as 111 and their associated digital terminals such as T11. This DCP format consists of a framing bit and three fields: an S field that conveys control signaling data, and two I fields that convey information data (FIG. 8). This is a well-known data transmission format as described in the article by N. Accarino et al entitled, "Frame-Mode Customer Access to Local Integrated Voice and Data Digital Network" published in the Conference Report of the IEEE 1979 International Conference on Communications. In this DCP data transmission format, one of the I fields can be used for the transmission of PCM-encoded voice information while the other one (or both I fields) can be used for the transmission of either bulk or interactive data.

MESSAGE FORMAT

The terminal equipment served by the business communication system may be various types of equipment and the terminal equipment illustrated in FIG. 1 has concurrent voice and data transmission capability. In this system, all the terminal equipment which receive voice transmissions from the user convert the received analog voice signals into a set of digital data segments, each comprising an eight bit PCM-encoded voice sample. The terminal equipment which generates digital transmissions (such as keyboards) receive and originate digital data messages which are generally of length greater than eight bits. A typical format (HDLC) of these data messages is illustrated in FIG. 9, wherein each data message includes flag characters at the beginning and end of the data message; data, control and address fields; and a cyclic redundancy check field for error checking purposes.

SIGNALING CHANNELS

This business communication system is equipped with two signaling channels which reflect the basic DCP message frame format used by the port circuits. In particular, a control signaling channel (S channel) conveys control messages (S field bits) between system processor 100 and digital terminals T11-T58. The S channel extends from each digital terminal (such as T11) through associated digital terminal interface module (DTIM) DT11, communication leads TR11, port circuit 111, leads P11 and thence through port data/control interface circuit 171 to system processor 100 via I/O BUS. The business communication system is also equipped with an information channel (I channel) which conveys information data (I field segments) such as the eight-bit PCM-encoded voice signals or bulk data (in eight-bit bytes) between switching network 101 and digital terminals T11-T58. The I channel extends from each digital terminal (such as T11) through associated digital terminal interface module (DTIM) DT11, communication leads TR11, port circuit 111, leads P11 and thence through port data/control interface circuit 171 to switching network 101 via leads PA1.

Thus, the ditigal terminal and its associated digital terminal interface module multiplex the actual data transmissions (voice and data) with the control signals. This multiplexed signal is then transmitted over the communication lead to the associated port circuit where it is demultiplexed. The actual data transmission is switched in traditional fashion by switching network 101 to the designated destination and the control signals are forwarded to system processor 100. Again, these control signals are the standard on-hook/off-hook status, button operation, lamp lighting, and ringing signals common to all telephone switching systems. To effectively illustrate the structure and operation of the subject interface arrangement, the details of the existing port circuit and especially the S channel must first be explored.

I CHANNEL REALIZATION

System processor 100, in the course of connecting a calling digital terminal (T11) to a called digital terminal (T58), assigns a time slot in switching network 101 for the interconnection of digital terminals T11 and T58. Switching network 101 controls the data (I channel) transmissions between digital terminals T11-T58. In particular, switching network 101 transmits each eight bit data segment received from digital terminal T58 to port circuit 111 via port data/control interface circuit 175. Port circuit 111 transmits each data segment so received to digital terminal T11 via digital terminal interface module (DTIM) DT11 and also receives a reply data segment from digital terminal T11 via DTIM DT11 for transmission to digital terminal T58. Port circuit 111 transmits the replay data segment received from DTIM DT11 to switching network 101 via port data/control interface circuit 171. Switching network 101 stores the received data segment, and interchanges the data segments received from digital terminal T11 and digital terminal T58 during the time slot assigned for this call. This action interconnects these digital terminals.

S CHANNEL REALIZATION

The control or S channel transmissions are controlled by system processor 100. System processor 100 periodically scans each port, trunk and service circuit connected to switching network 101 to find if there is a control message for system processor 100. During each such scan cycle, system processor 100 transmits timing, address and control information to port data/control interface circuits 171-175 via I/O BUS. Each port data/control interface circuit (ex. 171) has a multiplexer which interprets the signals received on I/O BUS during each scan cycle and determines whether the address signal transmitted thereon identify one of the port circuits (e.g. 111) served by that port data/control interface circuit (171). If such a match occurs during a scan cycle, port data/control interface circuit 171 enables the indentified port circuit 111 to read the control message transmitted to port data/control interface circuit 171 by system processor 100.

Port circuit 111 reads the control message written into port/data control interface circuit 171 by system processor 100 and places the control message into a control message register (not shown) in port circuit 111. Port circuit 111 transmits this control message one bit at a time from the control message register to digital terminal interface module DT11. Digital terminal interface module DT11 assembles these serial bits into commands for digital terminal T11. Digital terminal T11 responds to these commands by performing the indicated operation, such as lighting a lamp, producing an audible ring signal, etc.

If digital terminal T11 has no replay or other control message to send back to system processor 100, digital terminal interface module DT11 transmits idle bits back to port circuit 111. If digital terminal T11 has a control message to send to system processor 100, it is written into the control message register of port circuit 111 one bit at a time. Port circuit 111 sets a data-ready bit in its status register (not shown) to indicate to system processor 100 that a control message has arrived from digital terminal T11. System processor 100 periodically scans the port circuit status registers via I/O BUS and port data/control interface circuit 171 for a set data-ready bit. When one is found, system processor 100 reads the control message stored in the control message register of port circuit 111 and resets the data-ready bit in the status register.

PORT CIRCUIT, FIGS. 4-6

Figure 4:
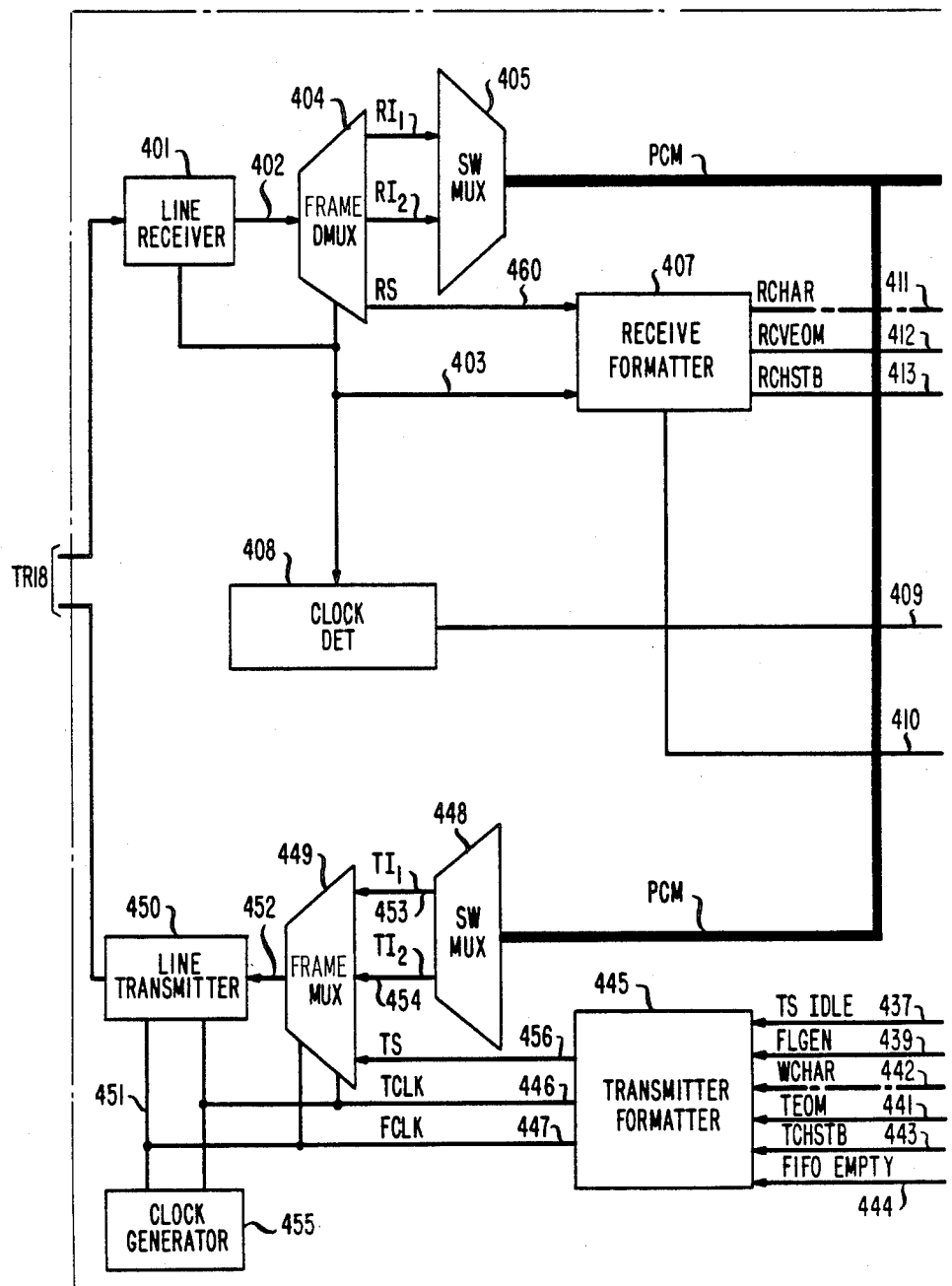
FIGS. 4 through 6 depict the details of the business communication system port circuit.
Figure 5:
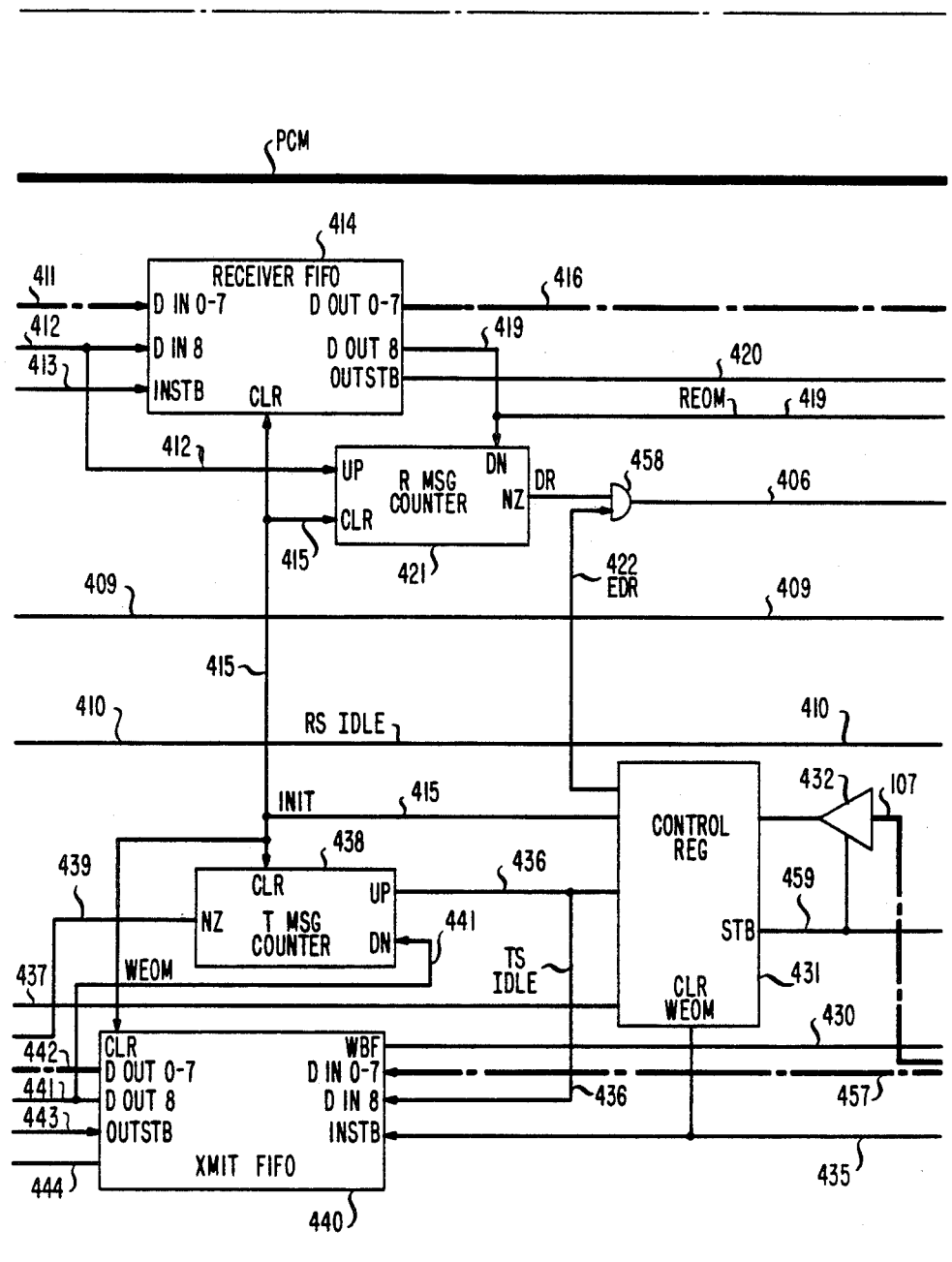
Figure 6:
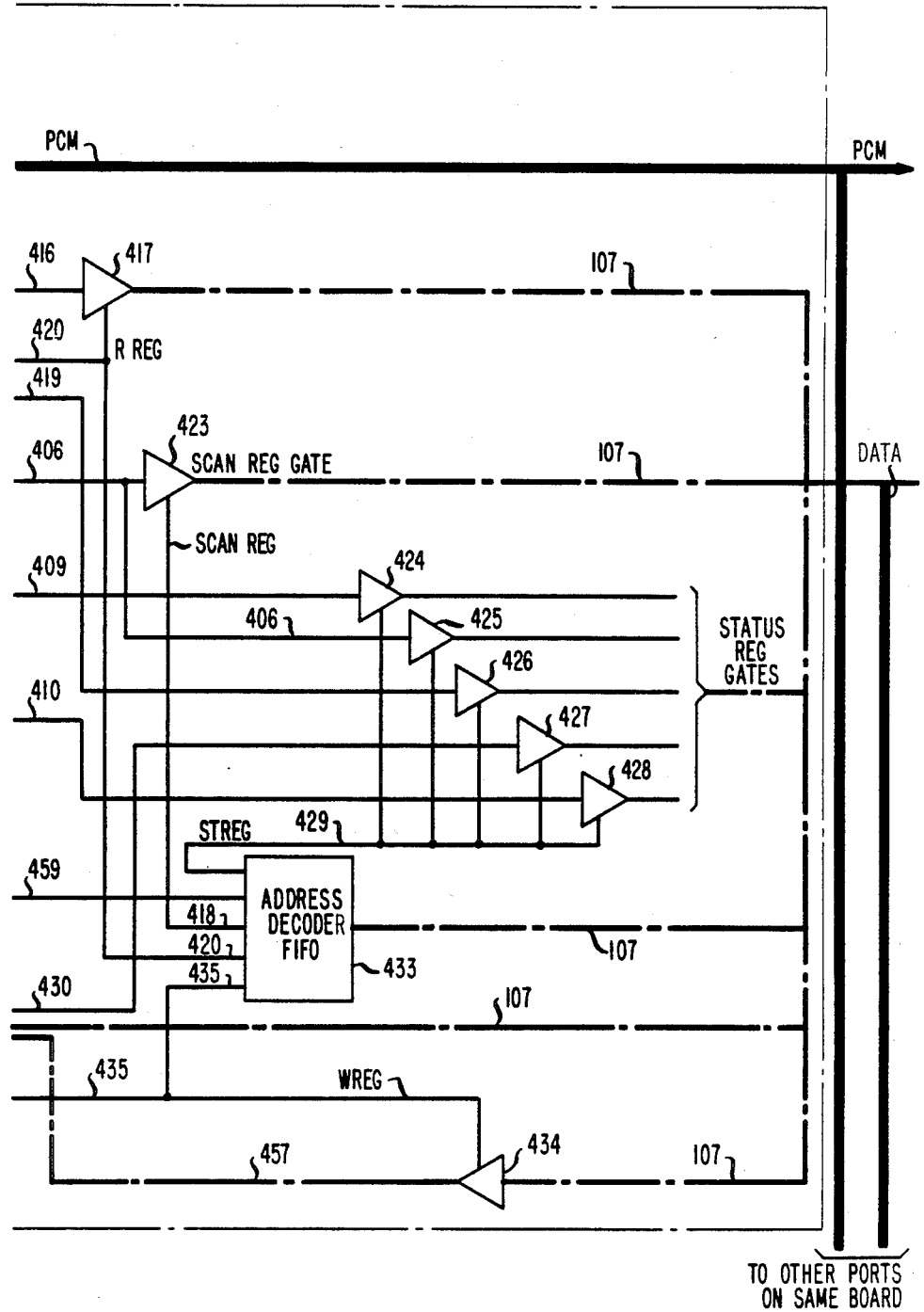

FIGS. 4, 5 and 6, when arranged shown in FIG. 7 disclose details of the port circuit with emphasis upon the port circuitry associated with the reception and generation of S bit signaling messages in the DCP frame format shown in FIG. 8. Additionally, details of this circuit are disclosed in U.S. Pat. No. 4,534,023, issued Aug. 6, 1985, to S. R. Peck et al.

The communication leads TR18 comprises a 160 kilobit per second data link to the associated terminal equipment, comptuer T18. The 160 kilobit rate results from the fact that message segments of 20 bits (as shown in FIG. 8) are transmitted between comptuer T18 and port circuit 118 at an 8 Khz rate. Alternate bipolar modulation is used to transmit the data signals.

RECEIVER

The operation of the receiving portion of port circuit 118 is first described. Message segments from computer T18 are recieved in the DCP frame format and applied over communication leads TR18 to line receiver 401. Line receiver 401 derives its synchronization from the framing bits of each received message segment and passes the remaining fields (the S field and the two I fields) in serial form to frame demultiplexer 404 over lead 402. The synchronization circuitry of line receiver 401 generates a receive clock signal and applies it over lead 403 to the control portion of demultiplexer 404 as well as to receive formatter 407 and clock detector 408.

Line receiver 401 separates the received signal from the noisy environment of the communication leads TR18 and transforms it into a logic level signal that is applied to the input of demultiplexer 404. Demultiplexer 404 demultiplexes the S field and the two I fields. The information in the two I fields comprises the data transmission from computer T18. This data transmission is extended over leads RI$_1$ and RI$_2$ to multiplexer 405 which multiplexes the signals together and places them on time multiplexed bus PCM. Each I field occupies a different time slot on time multiplexed bus PCM and thus the information in each I field is transmitted out sequentially during each occurrence of its associated time slot. This information is applied to the time slot interchange facilities of the system which performs a conventional time slot interchange function and interconnects each I field with the port to which the call is directed. The interface from the switch multiplexer 405 to the bus PCM contains both data and clock signals to control the switch multiplexer 405 and the switch demultiplexer 448.

The S field information comprises one bit of the message segment of FIG. 8 and is applied over lead 460 to the receive formatter 407. Lead 460 comprises an eight kilobit per second serial channel carrying the S field information. Receive formatter 407 performs the customary flag detection operation on this signal. This is, it looks for a pattern of a 0, followed by six 1's and a 0, as shown on FIG. 9, and synchronizes to that pattern as long as the flags appear on lead 460. As soon as receive formatter 407 detects a nonflag sequence, as is the case when a signaling message character is received, it begins to perform a serial to parallel conversion on each nonflag byte. During the time when nonflag characters are being received, receive formatter 407 performs a conventional zero delete function whenever it detects a sequence of five 1's followed by a 0. It does this in accordance with the HDLC protocol in order to prevent a message character from being construed as the reception of a flag character. Receive formatter 407, while it is performing this serial to parallel conversion on nonflag characters, also detects the reception of a flag character at the end of each message. It then generates a signal that is applied to lead 412 to specify the end of message for the received character. This path is also termed RCVEOM (Receive End Of Message). Receive formatter 407 applies each character after it is formed into a parallel format to leads 411 and from there to the receiver FIFO 414. Receiver formatter 407 also generates a signal that is applied to lead 413 to control the strobing of information into FIFO 414. The signal on lead 413 appears concurrently with the signals on leads 411 and 412 so that they then can be strobed into FIFO 414.

Receive FIFO 414 is organized as a 48 word, nine bit per work FIFO. The nine bits in each word are the eight bits representing the received character on leads 411 and a one bit "end of message" signal on lead 412 indicating whether or not each receive character does or does not represent the last character of a message. The characters that are applied to the input of receive FIFO 414 pass through in the conventional manner to the output of receive FIFO 414. These eight bits are applied over leads 416 to tri-state gates 417. The end of message signal associated with each character is applied over lead 419 to counter 421. The end of message signal is present only when the character is indeed the last character of a message and, at that time, the end of message signal increments counter 421 by a count of one.

Tri-state gates 417 are enabled by a read register signal on lead 420. This signal is generated by system processor 100 and applied to port circuit 111 over I/O BUS via port data/control interface circuit 171 and leads DATA when system processor 100 wishes to read the contents of FIFO 414. System processor 100 effects this operation by applying a unique address signal over the above described path to address decoder 433 to cause it to generate an output on lead 420 extending to FIFO 414 and gates 417. Each port circuit, including port circuit 111 shown on FIGS. 4, 5 and 6, is assigned a plurality of I/O BUS addresses. The various addresses represent the various functions of which the port circuit is capable. A particular function is initiated by the application of the associated I/O BUS address to address decoder 433. Accordingly, in order to read out a character from FIFO 414, system processor 100 applies the port address associated with lead 420 to address decoder 433 via the DATA leads. Address decoder 433 responds to this address, drives lead 420 to cause the character at the output of FIFO 414 to be extended over leads 416 and through gates 417 to leads DATA. This character is then passed through port data/control interface circuit 171 and over I/O BUS to system processor 100 which stores it and every other received character until a complete message is formed.

The read register lead 420 also extends to the OUTSTB terminal of FIFO 414. FIFO 414 responds to the trailing edge of this signal and advances the next character stored within FIFO 414 to the output of FIFO 414 so that it can be read on the next read register operation. Thus, the read register signal on lead 420 performs two functions. The first is to enable gates 417 to pass the character currently on FIFO 414 output over leads 416, through gates 417 to DATA leads. The trailing edge of the read register signal on lead 420 advances the next character within FIFO 414 to the output of FIFO 414.

The ninth bit in FIFO 414 is the END OF MESSAGE bit on lead 419. This signal performs two functions. The first function is to provide a READ END OF MESSAGE signal to the input of the status gate 426. Status gate 426 can be read by system processor 100 when it peforms a READ STATUS REGISTER function on port circuit 111. Status gate 426 has a unique address and when system processor 100 applies this address to I/O BUS, the address isd ecoded by address decoder 433 which applies an enable signal over lead 429 to activate status gate 426. Status gate 426 applies the signal present on lead 419, to DATA leads for transmission to system processor 100. The enabling of lead 429 enables all of the status register gates 424 through 428.

The second function of the READ END OF MESSAGE signal bit on lead 419 is to decrement receive message counter 421. Counter 421 at any time has a count in it that indicates the number of messages currently stored within FIFO 414. Counter 421 is incremented by a RECEIVE END OF MESSAGE signal on lead 412 and is decremented when a READ END OF MESSAGE signal is read out of FIFO 414 on lead 419. Thus, the current count of counter 421 represents the number of complete messages currently stored within FIFO 414. The output of counter 421 on lead DR is the signal which permits a DATA READY indication to be read by system processor 100 as it scans status gates 424–428. The DR signal is extended through gate 458 when lead 422 carries an enables signal and from there the signal extends over lead 406 to the input of the scan register gate 423 and to gate 425.

System processor 100 can read either scan register gate 423 or FIFO 414 by applying the appropriate addresses to I/O BUS. The address for either of these is decoded by address decoder 433. The appropriate output of address decoder 433 is enabled to activate the appropriate tri-state gate, such as 423 or 417, to allow data to be applied to DATA leads.

TRANSMIT

System processor 100 can generate and write messages into port circuit 118 of FIGS. 4, 5 and 6 for transmission to computer T18. It does this by utilizing the write portion of port circuit 118. The first step system processor 100 performs on a port write operation it to determine whether transmit FIFO 440 is full and is able to accept the message. If FIFO 440 is not full, system processor 100 writes the first byte of the message into port circuit 118. System processor 110 performs this function by first applying the appropriate address signal to I/O BUS. The signal that is applied is that which is associated with the write portion of port circuit 118. Address decoder 433 decodes this address and generates the WREG signal on lead 435. This signal enables tri-state gate 434 which allows the message information now on I/O BUS to be extended through gate 434 and over lead 457 to the input of FIFO 440. This signal on lead 435 is also applied to the INSTB input of FIFO 440 to strobe the message information currently on lead 457 into FIFO 440.

Also strobed into FIFO 440 at this time is the ninth bit, a WRITE END OF MESSAGE bit, which is applied to FIFO 440 over lead 436. This signal indicates that the character associated with this bit is the last character of a transmitted message. System processor 100 sequentially writes each character of a message into FIFO 440. Just before the last character of the message is to be input into FIFO 440, system processor 100 writes into control register 431 via gate 432 and lead 459 to generate a WRITE END OF MESSAGE signal on lead 436. This signal is strobed into FIFO 440 at the same time the last byte of the message is strobed via the WREG signal on lead 435. The signal on led 436 is automatically reset after the last byte is written into FIFO 440 by the trailing edge of the WREG signal on lead 435.

Transmit FIFO 440 is organized as a 48 word by nine bits per word FIFO. Eight of the nine bits represent the character information; the ninth bit of each word represents the absence or presence of a WRITE END OF MESSAGE signal. Transmit FIFO 440 has a WRITE BUFFER FULL output termed WBF. When all 48 words in FIFO 440 are filled, the WBF signal is extended over lead 430 to status register gate 427. This gate is periodically read by system processor 100 prior to writing FIFO 440. When FIFO 440 is full, the output of gate 427 advises system processor 100 that FIFO 440 can accept no more bytes for the time being. If FIFO 440 is detected to be full in the middle of writing a message, system processor 100 will queue the remainder of the message and throttle the load until a previously loaded message is transmitted and FIFO 440 becomes sufficiently empty to accept at least one more byte.

The outputs of FIFO 440 are applied to lead 441 and 442. Lead 442 carries eight bits representing character information and lead 441 carries and END OF MESSAGE bit. FIFO 440 receives a strobe signal from transmit formatter 445 over lead 443. The character information on lead 442 and the END OF MESSAGE signal on lead 441 are applied to the input of transmit formatter 445. Transmit formatter 445 normally continuously generates and sends out flag characters on the channel to the associated customer station as long as there are no messages in FIFO 440. At such times, transmit formatter 445 sequentially generates a flag character of 0, six 1's and a 0. Whenever FIFO 440 is not empty, transmit formatter 445 begins the process of unloading the characters from FIFO 440 and transmitting them out over the S channel. It does this by performing a parallel to serial conversion on the received characters and the zero insertion function required for transparency. Thus, transmit formatter 445 first sends out flag characters when it determines from transmit FIFO 440 over lead 439 that FIFO 440 is not empty, then, at the end of transmission of the flag character, transmit formatter 445 generates a strobe signal that is applied over lead 443 to FIFO 440. This signal is used internally by transmit formatter 445 to load the character information on lead 442 and any END OF MESSAGE signal on lead 441 into transmit formatter 445. The trailing edge of this strobe signal is also used to advance FIFO 440 to bring the next character in FIFO 440 to the FIFO output.

Transmit formatter 445 performs a parallel to serial conversion on the received information. It also performs a zero insertion function when it is sending nonflag characters out over lead 446. That is, if the transmitted bit stream of the message has five consecutive 1's, transmit formatter 445 inserts a 0 between the fifth-1 and the next bit transmitted. Thus, transmit formatter 445 transmits out each character it receives and it checks the END OF MESSAGE bit associated with each character. When the last character in a message is received from FIFO 440, lead 441 is set to a 1. This tells transmit formatter 445 that this character is the end of a message and causes transmit formatter 445 to insert a flag after this character. Transmit formatter 445 does this and then checks for a transmit empty signal on lead

444. If the empty signal is present, transmit formatter 445 continues to generate and transmit flags. If the empty signal is not present, transmit formatter 445 then reads the next character out of FIFO 440. This new signal is a first character of a subsequent message. Transmit formatter 445 processes any such first characters of the subsequent message, and all other characters of that subsequent message, in a manner similar to that already described.

System processor 100 can write an initialize bit into control register 431. This bit causes FIFOs 414 and 440 to be cleared as well as the message counters 421 and 438. This effectively removes all information from port circuit 118.

Lead 409 interconnects clock detector 408 with status register gate 424. Clock detector 408 normally receives clock pulses on lead 403 from line receiver 401. At such times, clock detector 408 applies a 0 over lead 409 to register gate 424. This permits system processor 100, when reading register gates 424–428, to determine that clock pulses derived from the received data stream are being received over communication leads TR18 by line receiver 401 and applied over lead 403 to clock detector 408. This is the normal operable state of the system. If, for any reason, line receiver 401 fails to receive a data stream, clock detector 408 receives no clock pulses and sets lead 409 equal to a 1 to permit system processor 100 to read gate 424 and determine this condition. This condition could exist for example when the associated digital terminal T11 is disconnected from communication leads TR11.

Lead 422 interconnects the lower input of AND gate 458 with control register 431. This path is normally held in an enabled state by control register. This enables gate 458 and permits the DR output of counter 421 to be extended over lead 406 to scan register gate 423. This DATA READY signal is used to advise system processor 100 that at least a single message is currently contained within receive FIFO 414.

Address decoder 433 contains flip-flops so that when an address is applied to the I/O BUS together with appropriate control signal by system processor 100, these control signals latch the address into the decoder flip-flops. The output of these flip-flops extends to circuitry which decode the address and give output signals unique to each different address. One of these output signals extends to lead 459. This signal is active at the time that data appears on I/O BUS and is used to strobe the data into latches in control register 431. That data is persistent because it is latched into control register 431. Control register 431 contains flip-flops which store the state of port circuit 111 as controlled by system processor 100, as subsequently described.

Transmit message counter 438 functions similarly to receive message counter 421 to indicate whether FIFO 440 currently contains a complete message. Transmit message counter 438 is incremented over lead 436 when a message is entered into FIFO 440. Transmit message counter 438 is decremented over lead 441 when a message is read out of FIFO 440.

The output of transmit formatter 445 extends over lead 456 to the frame multiplexer 449. Switch demultiplexer 448 receives PCM time slot signals on bus PCM, separates out the I1 and I2 field signals for use by port circuit 118 from their assigned time slots and applies them to leads 453 and 454. An output of transmit message counter 438 extends to transmit formatter 445 on lead 439 which indicates when the contents of transmit message counter 438 is 0. This implies that no messages are contained in FIFO 440 and that transmit formatter 445 should generate flag characters.

The I1, I2 signals are received by frame multiplexer 449 together with the serialized S channel bits on lead 456. Once each frame, frame multiplexer 449 inserts the eight bit I1 field, the eight bit I2 field and the one bit S field into a framing signal and applies it over lead 452 to the line transmitter 450 which adds the F field bits. From there, resultant twenty bit frame of FIG. 8 is extended over communication leads TR18 to computer T18.

Line transmitter 450 and frame multiplexer 449 operate under control of the output signals from clock generator 455. Switch demultiplexer 448 receives its control signals from bus PCM.

DETAILS OF DCP INTERFACE CARD

DCP interface card 201 is a processor controlled circuit which functions as a message handler and protocol converter. DCP interface card 201 converts the DCP signals or port circuit 151 and digital telephone station set T51 to data for PC BUS 207 and vice versa. The physical and link layer protocols are handled by the devices which comprise DCP interface card 201. DCP interface card 201 provides personal computer PC51 with access to and control of data and signalling both to and from the business communication system. DCP interface card 201 looks to the business communication system like a digital phone with data and display modules while DCP interface card 201 looks to the digital telephone station set like a digital port board of the business communication system. Information from both the business communication system and the digital telephone station set associated with personal computer PC51 is transferred to personal computer PC51 over a single multiplexed data channel. With access to and control of the signaling channel to the business communication system personal computer PC51 can implement advanced voice and data features in cooperation with the operation of the existing voice and data features on the business communication system.

Figure 3:
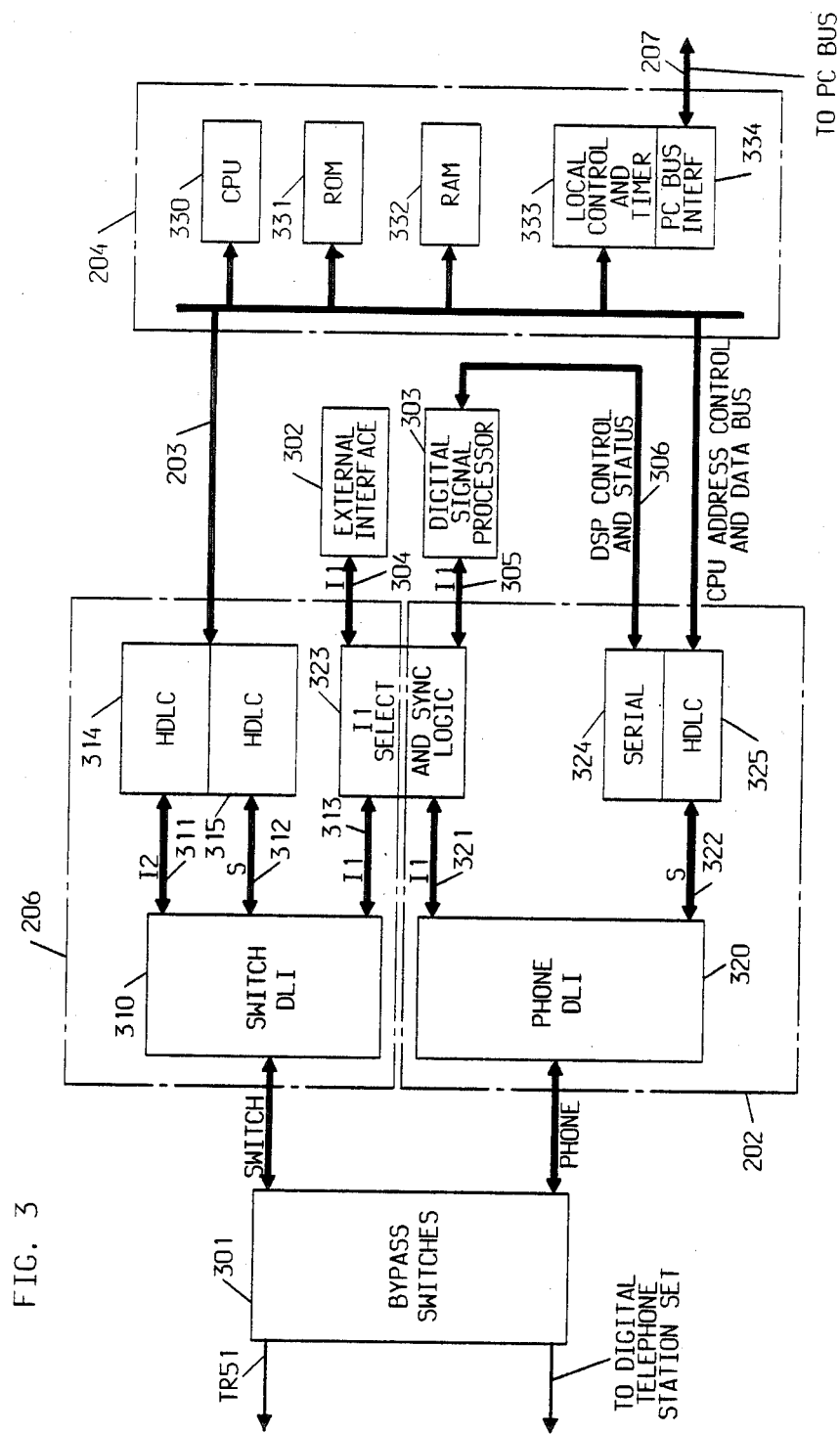
FIG. 3 illustrates a detailed schematic diagram of the subject interface apparatus.

FIG. 3 is a detailed block diagram schematic of DCP interface card 201. The major functional pieces of DCP interface card 201 as described above are illustrated in further detail in FIG. 3. These major component parts include telephone station set interface 202, bus communication controller 204 and business communication system interface 206. In addition to these major components FIG. 3 illustrates bypass switches 301 which function to directly connect the digital telephone station set to the communication leads TR51 in the case where personal computer PC51 is turned off or there is a power failure. External interface 302 is a connection shown to DCP interface card 201 which can be used for additional equipment such as a speaker phone, as will be described below. Digital signal processor 303 is a wired logic device which functions to perform call progress tone and Touch-Tone detection and Touch-Tone signal generation as will be described below.

CPU 330

The operation of DCP interface card 201 is controlled by a microprocessor shown on FIG. 3 as CPU 330. CPU 330 can be any state of the art microprocessor such as a Motorola 68000 16 bit microprocessor. CPU 330 is a microprocessor that supports the high lever C programming language. CPU 330 works off a vectored interrupt scheme to speed software response to interrupts. The main functions of CPU 330 are:

(1) communicate with the business communication system over the S channel through the switch S channel HDLC protocol and terminate levels 2 and 3 of the S channel terminal protocol, (2) send and receive data over the I2 channel of the HDLC protocol to the business communication system and terminate levels 2 and 3 of this protocol, (3) communicate with the digital telephone station set over the S channel through the phone S channel HDLC protocol and terminate level 2 of this protocol, (4) control digital signal processor 303 to generate Touch-Tone signals or to detect both call progress tones and Touch-Tone signals, (5) control bypass switches 301 and the I1 select and sync logic 323, (6) control timing and respond to interrupts used in protocol processing, (7) communicate with personal computer PC51 over PC BUS 207 to send and receive messages between DCP interface card 201 and personal computer PC51 to send and receive information for all the data channels described above.

LINE TERMINATION

In order to understand the operation of CPU 330 it is first necessary to understand the operation of telephone station set interface 202 and business communication system interface 206. As was mentioned above, the communication leads TR51 and the communication leads from the digital telephone station set are terminated on bypass switches 301. Bypass switches 301 either connect the signals from the business communication system directly to the digital telephone station set or connect the signals from both the digital telephone station set and the business communication system to telephone station set interface 202 and business communication system interface 206 respectively. In this fashion, bypass switches 301 operate to perform a power failure transfer function. Bypass switches 301 are operated to directly connect the digital telephone station set to the business communication system when personal computer PC51 is not turned on or not functioning properly or there is a power failure or DCP interface card 201 is not functioning properly. In all other cases bypass switches 301 are not operated and the communication leads TR51 is terminated on business communication system interface 206. In similar fashion, the communication leads from digital telephone station set T51 are routed through bypass switches 301 to terminate on telephone station set interface 202.

Both telephone station set interface 202 and business communication system interface 206 contain a DCP interface circuit identified on FIG. 3 as switch DLI 310 and phone DLI 320 respectively. Both switch DLI 310 and phone DLI 320 implement a DCP system interface as was described above in the discussion of port circuit 118. In particular, switch DLI 310 and phone DLI 320 comprise line receiver 401, frame demultiplexer 404, clock detector circuit 408, line transmitter 450, frame multiplexer 449 and clock generator 455 of FIG. 4 as described above for port circuit 118. These elements operate as described above to terminate the DCP signaling protocol. The switch DLI 310 is configured in the terminal mode so that it appears as a digital telephone station set with display and data modules to the business communication system. Phone DLI 320 is configured in the port mode so it appears as a digital port such as port circuit 118 to digital telephone station set T51. Both switch DLI 310 and phone DLI 320 separate the received DCP signals into the serial S, I1, and I2 channels and combine the transmitted serial S, I1, and I2 channels into the transmitted DCP signals as described above.

S, I1 and I2 CHANNEL SIGNAL ROUTING

The S, I1 and I2 channels are all used in the DCP protocol tranmsissions between the business communication system and the DCP interface card 201 to carry voice, control and data signals therebetween. Between digital telephone station set T51 and DCP interface card 201 only the S1 and the I1 channels are used to transmit control and voice signals. The S2 and I2 channels are not used with the digital telephone station set because all data transmissions to and from the business communication system are terminated on personal computer PC51.

Signals carried on the I1 channel are the voice communication signals which are transmitted between the digital telephone station set and the business communication system. Therefore, the voice signals of the I1 channel are not switched to personal computer PC51 in this described application. I1 select and synchronization logic 323 functions to interconnect the various sources and destinations for the I1 channel voice signals. The voice signals can originate from digital telephone station set T51, from digital signal processor 303 as Touch-Tone signals, from the business communication system on communication leads TR51 or from external interface 302. The voice communication signals on the I1 channel can be directed to digital telephone station set T51 from the business communication system or from the digital signal processor 303 or from external interface 302. Therefore, I1 select and sync logic 323 interconnects the voice communication signals from either the business communication system as separated by switch DLI 310 and applied to lead 313 or from external interface 302 and applied to lead 304 or from digital signal processor 303 and applied to lead 305 to lead 321 which carries these voice communication signals to the phone DLI 320 where these voice signals are encoded into the DCP signaling format and transmitted to digital telephone station set T51. In similar fashion, voice communication signals can be directed to external interface 302 from either the business communication system or digital telephone station set T51. I1 select and sync logic 323 receives the voice communication signals from the business communication system as decoded by switch DLI 310 and applied to lead 313 or from digital telephone station set T51 and decoded by phone DLI 320 and applied to lead 321 and switches these signals to lead 304 where they are applied to external interface 302. Switch DLI 310 receives voice communication signals from external interface 302 or from digital signal processor 303 or from digital telephone station set T51 via I1 select and sync logic 323. The remaining destination for voice communication signals is digital signal processor 303. Digital signal processor 303 is a wired logic processor which functions to decode call progress tones or Touch-Tone signals received from the business communication system. These call progress tones and Touch-Tone signals are transmitted by the business communication system over communication leads TR51 and decoded by switch DLI 310 and applied to lead 313. I1 select and sync logic 323 switches the received tones to lead 305 to digital signal processor 303 where these tones are detected and analyzed. The resulting control signals identifying the call progress tone or Touch-Tone signals are applied by digital signal processor 303 to lead 306.

I/O DEVICES

Devices 314, 315, 324 and 325 are serial input/output devices each of which contains an independent full duplex serial data channel that is programmable for either synchronous or asychornous modes. These devices are commercially available input/output devices such as a MOSTEK MC68564P device. Input/output devices 314 and 315 are programmed to handle the HDLC bit synchronous mode to process the switch S and I2 data channels. Input/output device 324 is programmed to the asychronous mode to communicate with digital signal processor 303 while input/output device 325 is programmed to the HDLC bit synchronous mode to handle the S chanenl for the digital telephone station set. The serial channels programmed for the HDLC mode have the following attributes:
(1) automatic 0 insertion and deletion
(2) automatic flag insertion between messages
(3) abort sequence generation and detection
(4) internal flag detection and synchronization
(5) automatic cyclic redundancy check The asynchronous communication channel with digital signal processor 303 has the following attributes: six bits per character; one start bit; one stop bit; no parity. Input/output devices 314, 315, 324, 325 contain control, status and data registers. These devices generate interrupts when either the received data register contains data or the transmit data register needs data. CPU 330 responds to the interrupts generated by one of devices 314, 315, 324, 325 and applied to CPU address control and data bus leads 203 by reading the contents of the received data register for a received interrupt and sending a character to the transmit data register for a transmit interrupt in the device generating the interrupt.

Thus, when digital signal processor 303 interprets call progress tones, the resultant control signals are loaded in the registers of I/O device 324 and I/O device 324 generates an interrupt for CPU 330. CPU 330 responds to this interrupt by reading the data register indicating the call progress tone present on communication leads TR51 from the registers in I/O device 324.

DIGITAL SIGNAL PROCESSOR

Digital signal processor 303 is programmed for three modes of operation, Touch-Tone generation and the detection of call progress tone or Touch-Tone signals. CPU 330 controls the operation of digital signal processor 303 via the registers in I/O device 324. In Touch-Tone generation mode, CPU 330 transmits a Touch-Tone command via CPU address, control and data bus 203 to I/O device 324. Digital signal processor 303 reads the Touch-Tone command from I/O device 324 and generates the Touch-Tone signals which are applied via led 305 to I1 select and sync logic 323. I1 select and sync logic 323 forwards the generated Touch-Tone signals via lead 313 to switch DLI 310 which incorporates the generated Touch-Tone signals into the I1 field of a DCP signal which is applied to communication leads TR51 to the business communication system. In similar fashion, CPU 330 can apply control signals to CPU address control and data bus 203 to load call progress tone detection or Touch-Tone signal detection commands into I/O device 324. Digital signal processor 303 responds to these loaded call progress tone detection or Touch-Tone signal detection commands by monitoring the I1 channel from the business communication system to detect the presence of call progress tones or Touch-Tone signals on communication leads TR51. This is accomplished by switch DLI 310 decoding the I1 channel signals from the DCP signals received from the business communication system, and applying the decoded I1 signals to lead 313 to I1 select and sync logic 323 which forwards the I1 channel signals via lead 305 to digital signal processor 303. Digital signal processor 303 is capable of detecting busy signals, dial tone, reorder tone, ringing intercept tone, call confirmation tones and all Touch-Tone signals. Digital signal processor 303 generates a call progress tone detected message or a Touch-Tone detected message in the response to the presence of one of the above tones and loads the tone detected message into the received data registers of I/O device 324 which device generates an interrupt for CPU 330. CPU 330 reads the tone detected message from I/O device 324 via CPU address control and data bus 203.

MEMORY AND TIMING

Read only memory 331 is the memory device on DCP interface card 201 which contains the instruction set for the operation of CPU 330. Random access memory 332 consists of the read/write memory which is used by CPU 330 as read/write memory space for transferring information to and from personal computer PC51. Local control and timer 333 and PC BUS interface 334 is a commercially available chip such as the Motorola MC68230 parallel interface/timer device. This combined device generates all the asynchronous bus interface signals and generates interrupt vectors for the timer and the parallel I/O registers. The parallel interface portion of this device is programmed to the bidirectional eight bit mode. PC BUS interface 334 functions to provide a buffered interface between PC BUS 207 and CPU address control and data bus 203.

DEVICE DRIVER PROTOCOL

S channel messages and I2 data from the business communication system and S1 channel messages from the adjunct telephone station set T51 as well as local control messages between DCP interface card 201 and device driver 211 and formatted into message frames, multiplexed into a single data stream, and transmitted between DCP interface card 201 and interrupt service routine 212 of device driver 211 via PC BUS 207. Each message frame in this data stream is delineated by an address header byte which is followed by a message length byte. The actual message is located in the message frame following the message length byte. A control register (not shown) in PC Bus interface 334 of DCP interface card 201 gives device drivers 211 control of both transmit and receive interrupts as well as transmit and receive direct memory access. The message frames are transferred beween DCP interface card 201 and device driver 211 on either a per byte basis using one interrupt per byte of data transferred or by direct memory access using one interrupt per block of data transferred. PC Bus interface 334 contains both a transmit register (not shown) and a receive register (not shown) which are used to store the message frames transferred between DCP interface card 201 and device driver 211.

DEVICE DRIVERS 211

Device drivers 211 is a software process that runs on processor 209 of PC51. Device drivers 211 interfaces communication management application 210 with DCP interface card 201. As shown on FIG. 2, two software processes comprise device drivers 211. Interrupt service routine 212 processes the data stream on PC BUS 207 and exchanges message frames between DCP interface card 201 and communication management application 210 by storing/retrieving the message frames in memory 208. In similar fashion, application interface 213 transfers message frames between communication management application 210 and memory 208. Interprocess communication path 214 is shown on FIG. 2 as interconnecting application interface 213 and interrupt service routine 212. This is a control message communication channel for passing control messages between application interface 213 and interrupt service routine 212. The actual implementation of interprocess communication path 214 is typically by way of each process accessing an interprocess communication section of memory 208. The interprocess communication section of memory 208 functions as a "mailbox" with each of processes 212 and 213 placing/retrieving messages into/from interprocess communication section of memory 208. These mailbox messages can be simply the setting of a flag or pointer for many communication applications.

KEEP ALIVE PROCESS

Figure 10:
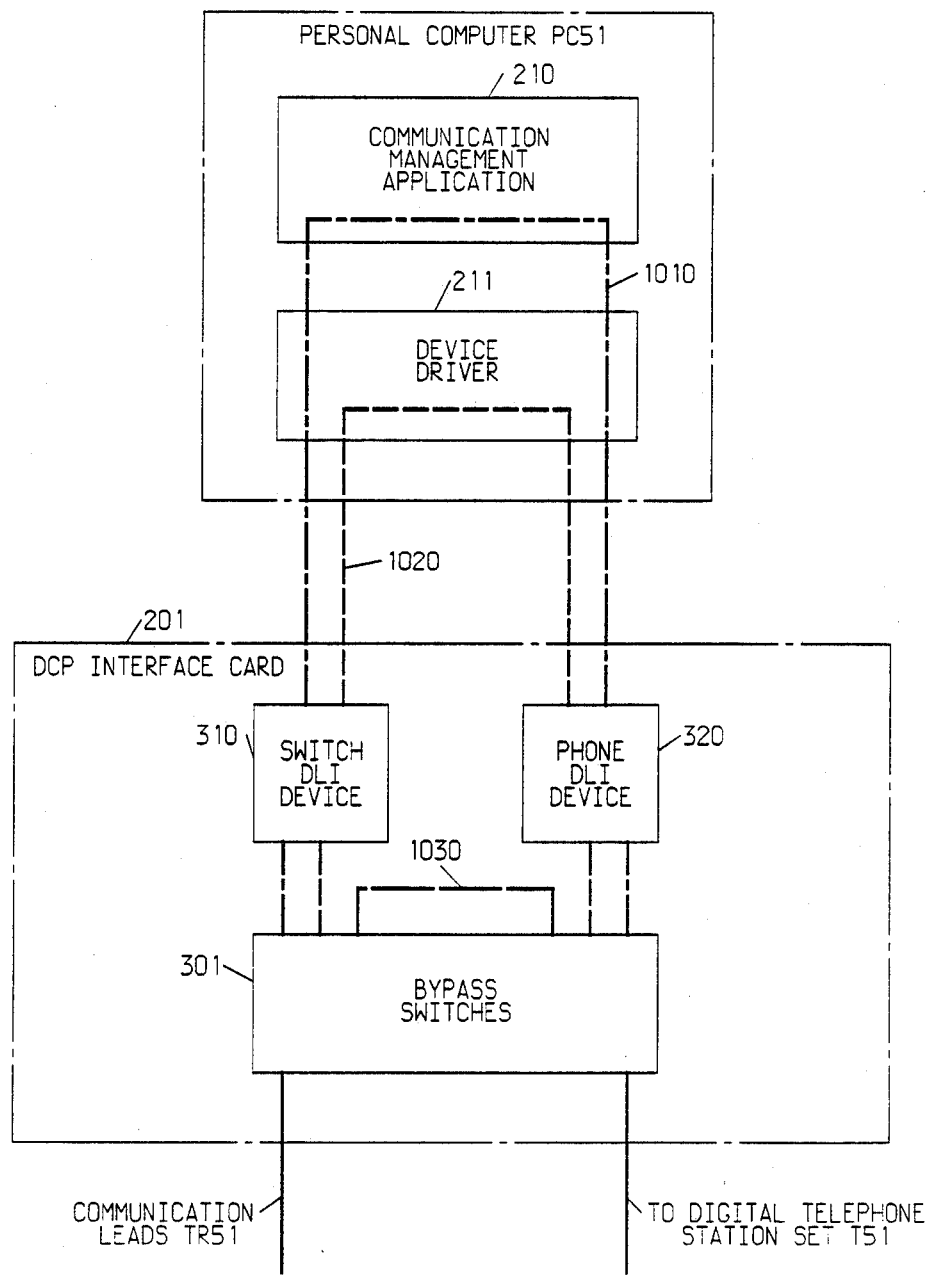
FIG. 10 depicts the three different modes of connectivity between the device driver, communication management application and the DCP interface card.

A keep alive process is used by DCP interface card 201 to maintain telephone service between digital telephone station set T51 and the business communication system even if device driver 211 or communication management application 210 fail. The various modes of communication are schematically illustrated in FIG. 10. Path 1010 indicates the normal or CMA mode of message flow while path 1020 illustrates a soft direct connect mode described below and path 1030 illustrates a direct connect mode described below.

If communication between DCP interface card 201 and device driver 211 fails, DCP interface card 201 enters a direct connect mode so that digital telephone station set T51 is directly connected to the business communication system. Timer 333 on DCP interface card 201 runs continuously and is reset on each message received from device driver 211. The business communication system transmits an S1 channel message to digital telephone station set every 6 to 12 seconds. These S1 channel messages are received by DCP interface card 201 and forwarded to device driver 211 as described above. Device driver 211 forwards this S1 channel message, or a modified version of the message, or a response message to DCP interface card 201. Thus, this periodic S1 channel message maintains the keep alive process timer.

If device driver 211 fails to transmit a message to DCP interface card 201 within 13 seconds, timer 333 times out and CPU 330 transmits a local control message to device driver 211 to indicate that DCP interface card 201 is about to enter the direct connect mode. If device driver 211 responds to this local control message within 2 seconds, CPU 330 resets timer 333. If device driver 211 does not respond to this control message within 2 seconds, CPU 330 activates bypass switches 301 to directly connect digital telephone station set T51 to communication leads TR51 (path 1030).

Another level of keep alive process is where communication management application 210 fails but device driver 211 is functioning. This is called soft direct connect mode (path 1020). The soft direct connect mode is activated when device driver 211 is functioning and receive the above-mentioned local control message indicating that DCP interface card 201 is about to enter the direct connect mode. If communication management application 210 does not respond to this message, device driver 211 enters the soft direct connect mode and forwards all messages received without the intervention of communication management application 210.

VOICE ORIGINATED CALL FROM PC51

In order to better understand the operation of DCP interface card 201 and device driver 211, the following description of a simple call connection is used to illustrate the operation of the above described elements which comprise DCP interface card 201 and device driver 211. Voice calls can be originated from PC51 in several different ways: keyboard dialing, mnemonic dialing, or directory dialing. For the purposes of this description, keyboard dialing will be used as an illustrative example.

A person (described below as user) accessing PC51 initiates a voice call by entering a number from the keyboard of PC51 and then pressing the carriage return key on the keyboard of PC51. In response to the entry of this keyboard dialed number, communication management application 210 transmits an S1 channel (the voice control portion of the S channel) off-hook message to application interface 213. Application interface 213 responds to this off-hook message by enabling the transmit interrupt in the control register portion of PC Bus interface 34 and changing buffer pointers via path 214 for interrupt service routine 212. Receive interrupts are always enabled. PC Bus interface 334 generates an interrupt when the transmit register is empty. Interrupt service routine 212 responds to the transmit register empty interrupt by forwarding the off-hook control message, which is temporarily stored in memory at the end of the transmit buffer, along with the appropriate address header byte and message length byte over PC BUS 207 to PC Bus interface 334 and thence through local control and timer 333 and over CPU address, control and data bus 203 to CPU 330 on DCP interface card 201. Upon completion of the transmission of the off-hook message, interrupt service routine 212 disables the transmit interrupt in the control register of PC Bus interface 334.

MESSAGE TRANSFER BETWEEN PC BUS AND COMMUNICATION LEADS

CPU 330 responds to the received off-hook message by forwarding this message via CPU address, control and data bus 203 to HDLC device 315. As discussed above, HDLC device 315 in cooperation with switch DLI 310 formats and transmits DCP format message frames to the business communication system by way of communication leads TR51.

Upon receipt of the off-hook message forwarded by CPU 330, the business communication system responds by transmitting a DCP message frame which contains an S1 channel lamp update message to DCP interface card 201 via communication leads TR51. This lamp update message is retrieved from the DCP message frame by switch DLI 310 and forwarded on lead 312 to HDLC device 315. CPU 330 retrieves the lamp update message from HDLC device 315 via CPU address, control and data bus 203. CPU 330 appends address header and message length bytes to the lamp update message to create a message frame for PC51. CPU 330 then generates an interrupt by way of PC bus interface 334 to device driver 211. Interrupt service routine 212 of device driver 211 responds to the receive interrupt by reading the lamp update message via interrupts and direct memory access from the receive register in PC bus interface 334 where CPU 330 has forwarded the message frame containing the lamp update message. Interrupt service routine 212 stores the S1 channel lamp update message in a buffer in memory 208 for communication management application 210. Communication management application 210 periodically polls application interface 213 and reads the stored lamp update message via application interface 213 which retrieves the lamp update message from memory 208.

CONTROL MESSAGE FROM PC51 TO TELEPHONE STATION SET T51

Communication management application 210 responds to the lamp update message by updating the screen on PC51 to indicate to the user the PC51 that the off-hook signal has been received by the business communication system. Communication management application 210 also forwards the lamp update message to adjunct telephone station set T51 by way of DCP interface card 201. This is accomplished by communication management application 210 transmitting the lamp update message to application interface 213 which appends the appropriate address header and message length bytes and places this message in memory 208. As described above, application interface 213 enables the transmit interrupt in the control register portion of PC Bus interface 334. Interrupt service routine 212 then forwards the lamp update message by interrupts and DMA to PC Bus interface 334 which forwards this message through local control and timer 333 and CPU address, control and data bus 203 to CPU 330. Upon completion of the message transmission, interrupt service routine 212 disables the transmit interrupt in the control register of PC Bus interface 334.

CPU 330 responds to the received lamp update message designated for telephone station set T51 by transmitting the lamp update message via CPU address, control and data bus 203 to HDLC device 325 where the lamp update message is forwarded to phone DLI 320 for formatting into a DCP message frame for adjunct telephone station set T51. As described above, phone DLI 320 transmits DCP format message frames to adjunct telephone station set T51 and the subject lamp update message is transmitted as described above.

DIALED NUMBER PROCESSING

Communication management application 210 now processes the number entered by the user at PC51 through the keyboard. Communication management application 210 transmits the dial string entered from the keyboard to application interface 213, which parses the dial string and transmits the digits through a generate Touch-Tone control message through memory 208 and interrupt service routine 212 to CPU 330 via the transmit register as described above. CPU 330 responds to the generate Touch-Tone control message by transmitting control signals via CPU address, control and data bus 203 to digital signal processor 303 as described above. Digital signal processor 303 responds to the control signals transmitted by CPU 330 by generating corresponding Touch-Tone signals on the I1 channel for transmission to the business communication system. The Touch-Tone signals generated by digital signal processor 303 are forwarded over lead 305 to I1 select and sync logic 323 where the signals are routed over lead 313 to switch DLI 310. The Touch-Tone signals so routed are formatted into a DCP message frame for transmission to the business communication system via communication leads TR51.

SECOND DIAL TONE

If, as part of the dialing, a wait for the second dial tone is needed, application interface 213 sets pointers and flags via interprocess control path 214 for interrupt service routine 212. Application interface 213 sends a call progress monitor control message via memory 208 and interrupt service routine 212 to CPU 330. CPU 330 responds to the call progress monitor control message by placing digital signal processor 303 in a call progress monitor mode wherein digital signal processor 303 is connected by I1 select and sync logic 323 to switch DLI 310 to monitor all signals received from the business communication system on communication leads TR51 to determine whether dial tone is present on communication leads TR51 in the I1 field of the DCP message frames. When a dial tone signal is received from the business communication system in the I1 field of a DCP message frame on communication leads TR51, this dial tone signal is routed in standard fashion by switch DLI 310 over lead 313 to I1 select and sync logic 323 which forwards the dial tone signal over lead 305 to digital signal processor 303. Digital signal processor 303 responds to the received dial tone by transmitting a control signal over lead 306, I/O device 324 and CPU address, control and data bus 203 to CPU 330 indicating that dial tone has been received. CPU 330 responds to this dial tone received signal by generating a dial tone received control message which is transmitted by PC Bus interface 334 to interrupt service routine 212. In response to the received dial tone received control message, interrupt service routine 212 transmits the remainder of the dial string in control messages via PC Bus interface 334 to CPU 330. CPU 330 interprets the received dial string messages and generates signals to digital signal processor 303 which generates and transmits the appropriate Touch-Tone signals to I1 select and sync logic 323. When all the Touch-Tone signals have been transmitted by digital signal processor 303 to the business communication system via communication leads TR51, interrupt service routine 212 transmits a control message via PC Bus interface 334 to CPU 330 to place digital signal processor 303 in a call progress monitor mode to determine the status of the call for feedback to the user.

RINGING THE CALLED PARTY

Once the business communication system receives the Touch-Tone signals corresponding to the complete dial string, the business communication system signals the called party and transmits the called party identification to DCP interface card 201 in an S1 channel display message. The called party display message is transmitted by the business communication system in a DCP message frame over communication leads TR51 to switch DLI 310. The S channel portion of the DCP message frame is forwarded by switch DLI 310 over lead 312 to HDLC device 315. As discussed above, CPU 330 retrieves the called party display message from HDLC device 315 via CPU address, control and data bus 203. CPU 330 responds to the received called party display message by appending the appropriate address header and message length bytes before transmitting the message to interrupt service routine 212. Interrupt service routine 212 reads the called party display message via interrupts and direct memory access and places the called party display message in a buffer in memory 208 for communication management application 210. Communication management application 210 periodically polls application interface 213 and thereby obtains the called party display message from memory 208 via application interface 213. In repsonse to the received called party display message, communication management application 210 updates the screen on PC51 to indicate to the user that the call has been placed to the designated party. Communication management application 210 also forwards the called party display message to adjunct telephone station set T51 as was described above for the off-hook message.

The business communication system transmits periodic ring back tones on the I1 channel of the DCP message frames to DCP interface card 201 over communication leads TR51 to indicate that the called party is being rung. Digital signal processor 303 is in the call progress monitoring mode and responds to each received ring back tone by generating a control signal for CPU 330. CPU 330 responds to each call progress tone received by digital signal processor 303 by transmitting a control message via PC Bus interface 334 to interrupt service routine 212. This control message causes interrupt service routine 212 to transmit a call progress monitor control message to CPU 330 to reset the timer. Interrupt service routine 212 will also pass the ring back information to communication management application 210 by way of interprocess control path 214 to application interface 213. Communication management application 210 displays ring back information to the user by flashing the text "Ringing" on the screen of PC51. The user at PC51 can now pick up the handset on adjunct telephone station set T51 to be connected to the call or can wait for the called party to answer. If the user has turned on a speakerphone connected to external interface 302, the user hears ringback tone and is automatically connected to the called party when the called party answers the call by going off-hook.

CALL COMPLETION

Assume for the purpose of this description that the user at PC51 picks up the handset on adjunct telephone station set T51. At this point, the user is connected from adjunct telephone station set T51 through phone DLI 320, I1 select and sync logic 323, switch DLI 310 and the I1 channel of communication leads TR51 to the business communication system. When the called party answers, ring back tones are no longer placed on the I1 channel of the DCP message frames by the business communication system. Since these call progress tones are no longer present, digital signal processor 303 detects no tones and does not forward a control signal to CPU 330. Since no call progress tone control messages are forwarded by CPU 330 to device driver 211, device driver 211 does not send any call progress monitor control signal to CPU 330. Thus, CPU 330 times out and turns off digital signal processor 303 and then sends a control message to interrupt service routine 212 to indicate that digital signal processor 303 has been turned off. In this fashion, the call progress tone monitoring is disabled.

CALL TERMINATION

Upon the completion of the call, the user at adjunct telephone station set T51 goes on-hook. Adjunct telephone station set T51 responds to the on-hook condition by transmitting an S1 channel on-hook message to DCP interface card 201. Phone DLI 320 splits the S channel message from the HDLC message frame received from adjunct telephone station set T51 and transmits this S channel message over lead 322 to HDLC device 325. CPU 330 reads the on-hook message stored in HDLC device 325 via CPU address, control and data bus 203. CPU 330 responds to the on-hook message by generating a message frame which is transmitted by PC Bus interface 334 to interrupt service routine 212. Interrupt service routine 212 buffers the on-hook message in memory 208 for communication management application 210 to read during its next periodic poll of application interface 213. Communication management application 210 then forwards the on-hook message to CPU 330 via PC Bus interface 334 to be transmitted to the business communication system. CPU 330 responds to the on-hook message from interrupt service routine 212 by forwarding the on-hook message via CPU address, control and data bus 203 to HDLC device 315 which forwards the HDLC framed on-hook message to switch DLI 310 for formatting into a DCP message frame for transmission to the business communication system over communication leads TR51.

Final lamp update and display messages are transmitted to DCP interface card 201 by the business communication system in response to the on-hook message. These lamp update and display messages are S channel messages which are received by DCP interface card 201 over communication leads TR51. Switch DLI 310 routes these S channel messages to HDLC device 315 where they are stored for access by CPU 330. CPU 330 reads the lamp update and display messages from HDLC device 315 and formats them with the appropriate address header and message length bytes into a message frame for interrupt service routine 212. Interrupt service routine 212 stores the lamp update and display messages in memory 208 for access by communication management application 210 during the next poll of application interface 213 by communication management application 210. Communication management application 210 responds to the lamp update and display messages by updating the screen on PC51 and by forwarding the lamp update and display information via application interface 213 and interrupt service routine 212 to CPU 330 for forwarding as described above to adjunct telephone station set T51 to update the lamps on adjunct telephone station set T51.

The above description of a keyboard dialing originated call from PC51 can be replicated for mnemonic or directory dialing in similar fashion. In these two cases communication management application 210 responds to the information input by the user on the keyboard to access memory 208 to thereby retrieve a dial string associated with the mnemonic or directory entry input by the user via the keyboard. The resultant dial stream will then be processed as described above for the keyboard dialing case. In this fashion communication management application 210 can place a call using either the direct keyboard entry dialing or by performing a translation function from the directory identification or the mnemonic identification of a called party.

DATA ORIGINATED CALLS FROM PC51

The above description related to a voice call placed from PC51 to a called party. In similar fashion, a data call can be placed by a user at PC51 in one of several ways: keyboard dialing, mnemonic dialing or directory dialing. As above, keyboard dialing is selected as an illustrative example of a typical call origination setup sequence. The user at PC51 initiates a data call using keyboard dialing by entering a called party identification number from the keyboard of PC51 and then pressing the carriage return key on the keyboard of PC51. Communication management application 210 responds to the entered called party identification number by transmitting a control message to application interface 213 requesting that a data call be placed to the specified called party identification number using the specified baud rate. Application interface 213 responds to this data control message by transmitting an S2 channel (the data control portion of the S channel) off-hook message to the business communication system. Application interface 213 sends the dial string and baud rate to interrupt service routine 212 via 214. This is accomplished as described above by application interface 213 enabling a transmit interrupt in the control register portion of PC Bus interface 334. DCP interface card 201 generates an interrupt when the transmit register portion of PC Bus interface 334 is empty. Interrupt service routine 212 responds to this interrupt by transmitting the S2 channel off-hook message along with the appropriate address header and message length bytes via interrupts and direct memory access to CPU 330 via PC Bus interface 334. Once this S2 channel off-hook message has been transmitted, interrupt service routine 212 disables the transmit interrupt in the control register of PC bus interface 334. CPU 330 then transmits the S2 channel off-hook message to HDLC device 315 via CPU address, control and data bus 203. Switch DLI 310 reads the S2 channel control message from HDLC device 315, formats this control message into a DCP message frame and transmits the resultant DCP message frame to the business communication system over communication leads TR51.

DATA CALL DIALING

The business communication system responds to the S2 channel off-hook message by returning an S2 channel dial tone message with the text "Dial:" to DCP interface card 201 in the DCP message frames. This S2 channel dial tone message is routed by switch DLI 310 to HDLC device 315 where it is stored for retrieval by CPU 330. CPU 330 retrieves the S2 channel dial tone message and appends the appropriate address header and message length bytes before generating an interrupt via PC Bus interface 334 for interrupt service routine 212. Interrupt service routine 212 reads the S2 chanenl dial tone message via interrupts and direct memory access and responds the the S2 channel dial tone message by manipulating the called party identification number as received from application interface 213 into a format acceptable by the business communication system. Interrupt service routine 212 updates dialing status to application interface 213 via interprocess control path 214 for communication management application 210 to read. Interrupt service routine 212 transmits to CPU 330 this dial string in ASCII format at the rate of 5 digits per S2 channel message and, at the end of the dial stream, interrupt service routine 212 appends a carriage return character. CPU 330 forwards the received S2 channel message via HDLC device 315 and switch DLI 310 over the S2 channel of the DCP message frames to the business communication system.

When the business communication system receives the carriage return character appended to the end of the dial stream by interrupt service routine 212, the business communication system rings the called party and transmits an S2 channel ring back tone message with the text "Ringing" to DCP interface card 201. This received S2 channel ring back tone message frame is routed by switch DLI 310 to HDLC device 315 where it is retrieved by CPU 330. CPU 330 appends the appropriate address header and message length bytes to the S2 channel ring back tone message and forwards the resultant message to interrupt service routine 212. Interrupt service routine 212 updates dialing status to application interface 213 via interprocess control path 214 for communication management application 210 to read. Communication management application 210 reads the dialing status from application interface 213 and displays the text "Ringing" on the display of PC51.

DATA CALL COMPLETION

The call remains in the ringing state until the called desintation goes off-hook, at which time the business communication system transmits an S2 channel ring back removed tone message with the text "Answered" to DCP interface card 201. This message indicates that the called party has answered the data call. This S2 channel ring back remove tone message is routed by switch DLI 310 to HDLC device 315 for retrieval by CPU 330. CPU 330 appends the address header and message length bytes to this control message forwards same to interrupt service routine 212. Interrupt service routine 212 updates dialing status to application interface 213 via interprocess control path 214 for communication management application 210 to read. Communication management application 210 reads status via application interface 213 and displays "Answered" text to the user. In response to the received S2 channel ring back remove tone message, interrupt service routine 212 transmits a control message to CPU 330 to initiate the appropriate data protocol code (which is selected by the baud rate) on DCP interface card 201. The data protocol code runs on CPU 330, terminates levels 2 and 3 of the data protocol and provides a data interface between serial HDLC device 315 and interrupt service routine 212.

The data protocol code will handshake with the remote data module on the I2 channel by sending and receiving control messages via 314, 311, and 310. When the data protocol code of DCP interface board 201 and that of the remote data module determine that they are compatible, CPU 330 transmits a control message to interrupt service routine 212 indicating that the call setup was successful and interrupt service routine 212 responds by transmitting an S2 channel handshake success message to the business communication system. Interrupt service routine 212 transmits the S2 channel handshake success message to CPU 330 for formatting and transmission to the business communication system via HDLC device 315 and switch DLI 310. Interrupt service routine 212 also transmits the control message received from DCPI via application interface 213 to communication management application 210. In response to this received message, communication management application 210 updates the screen on PC51 to "active".

One example of a data transfer situation is where communication management application 210 is used for terminal emulation purposes. In this case, the user at PC51 enters data from the keyboard of PC51 and communication management application 210 transmits the data through application interface 213 and interrupt service routine 212 (which appends the address header and message length bytes) to the data protocol code which resides on CPU 330. The data protocol code transmits only the data using the appropriate framing on the I2 channel to the remote data module via HDLC device 314 and switch DLI 310. Data is received on communication leads TR51 from the remote module and is routed by switch DLI 310 to HDLC device 314. This I2 channel data is read by CPU 330 via CPU address, control and data bus 203. CPU 330 forwards this received data with address header and message length bytes to interrupt service routine 212 which passes only the data via application interface 213 to communication management application 210. The data received by communication management application 210 is either displayed for the user on the screen of PC51 or stored in a file in memory 208.

DATA CALL DISCONNECT

At the end of the call, the user at PC51 requests a disconnect. Communication management application 210 responds to the user's disconnect signal by transmitting a disconnect control message to application interface 213 requesting a disconnect. Application interface 213 transmits a control message through interrupt service routine 212 to CPU 330 to terminate the data protocol code. CPU 330 returns a control message to interrupt service routine 212 to indicate that the data protocol code is terminated. Interrupt service routine 212 responds to the data protocol code terminated message by transmitting an S2 channel on-hook message to the business communication system via CPU 330, HDLC device 315 and switch DLI 310. Interrupt service routine 212 then returns to the idle state.

For mnemonic and directory dialing, communication management application 210 replaces the keyboard input from the user in mnemonic or directory form with a dial string and then proceeds as discussed above with respect to the case of keyboard dialing.

INCOMING CALLS TO PC51

Incoming calls to PC51 are processed in similar fashion to outgoing calls as described above. The business communication system on an incoming voice call transmits the following messages to DCP interface card 201: an S1 channel ringer on message; an S1 channel display message with calling party identification; an S1 channel lamp update message. These messages are carried as part of the HDLC message frames on communication leads TR51 to switch DLI 310 where they are routed to HDLC device 315. CPU 330 sequentially retrieves these messages from HDLC device 315 via CPU address, control and data bus 203. CPU 330 appends address heade and message length bytes to each message then generates an interrupt to interrupt service routine 212 via PC Bus interface 334. Interrupt service routine 212 reads the message via interrupts and direct memory access and stores each received message sequentially in memory 208. Communication management application 210 retrieves these messages in sequential fashion by periodically polling application interface 213 which retrieves the messages from memory 208. Communication management application 210 responds to each message so received by updating the screen of PC51 and simultaneously forwarding the message to adjunct telephone station set T51. Communication management application 210 routes the message via application interface 213, interrupt service routine 212 to CPU 330. CPU 330 responds to each message forwarded by communication management application 210 by determining the identity of the destination for this message, in this case adjunct telephone station set T51, and forwards the S1 channel message via CPU address control and data bus 203 to HDLC device 325. Phone DLI 320 retrieves the S2 channel messages stored in HDLC device 325 and formats these messages into a DCP frame and transmits same to the adjunct telephone station set T51. Adjunct telephone station set T51 responds to the S1 channel ringer on message by generating an alerting tone to indicate to the user at PC51 that an incoming call has arrived. In addition, the S1 channel display message of a calling party ID causes adjunct telephone station set T51, if equipped with a display, to indicate the identity of the party calling the user at adjunct telephone station set T51. The S1 channel lamp update message causes adjunct telephone station set T51 to light the appropriate call indication. The user at PC51 can answer this call by picking up the handset on adjunct telephone station set T51. This action causes adjunct telephone station set T51 to transmit an S1 channel off-hook message to phone DLI 320 which routes this control message to HDLC device 325. CPU 330 retrieves the S1 channel off-hook message via CPU address, control and data bus 203, appends the appropriate header and message length bytes to this message and forwards the resultant control message to interrupt service routine 212 via PC Bus interface 334. Interrupt service routine 212 responds to the received S1 channel off-hook message from adjunct telephone station set T51 by storing the off-hook message in memory 208 for communication management application 210 to read via application interface 213 and forwarding this S1 channel off-hook message to the business communication system. Interrupt service routine 212 transmits the S1 channel off-hook message with the appropriate header and message length bytes to CPU 330 via PC Bus interface 334. CPU 330 decodes the header portion of this message to determine the destination for this control message. CPU 330 forwards the message via CPU address, control and data bus 203 to HDLC device 315. Switch DLI 310 retrieves the S1 channel off-hook message from HDLC device 315 and formats this message into a DCP frame and transmits the resultant frame to the business communication system over communication leads TR51 to indicate to the business communication system that the user at adjunct telephone station set T51 has gone off-hook. The conversation between the user at adjunct telephone station set T51 and the originating party continues until one of the parties goes on-hook at which time the call is terminated as discussed above for the case of the call originated by PC51.

Incoming data calls to PC51 are similar in operation to an incoming voice call described above. For an incoming data call, the business communication system transmits an S2 channel ringer on message to DCP interface board 201. Switch DLI 310 routes the S2 channel ringer on message to HDLC device 315 where it is stored for retrieval by CPU 330. CPU 330 appends the appropriate header and message length bytes to this received S2 channel ringer on message and forwards the resultant message frame to interrupt service routine 212 by way of PC Bus interface 334. If the user has specified in the communication management application 210 that auto answer is on, this status information is passed by communication management application 210 to interrupt service routine 212 via application interface 213 and interprocess communication path 214. Interrupt service routine 212 automatically answers the call by transmitting an S2 channel off-hook message to the business communication system. Interrupt service routine 212 transmits the S2 channel off-hook message with the appropriate header and message length bytes to CPU 330. CPU 330 decodes the header portion of this message to determine the destination to which this message is intended and forwards the control message over CPU address, control and data bus 203 to HDLC device 315. Switch DLI 310 retrieves the S2 channel off-hook message from HDLC device 315 and formats this message into a DCP message frame and forwards the frame to the business communication system over communication leads TR51. The business communication system responds to the received S2 channel off-hook message by transmitting an S2 channel ringer off message with the text "Answered" to DCP interface card 201. Switch DLI 310 routes this S2 channel ringer off message to HDLC device 315 where it is retrieved by CPU 330. CPU 330 appends the appropriate header and message length bytes to this S2 channel ringer off message and forwards the resulant message frame to interrupt service routine 212 by way of PC Bus interface 334. Interrupt service routine 212 responds to the received S2 channel ringer off message from the business communication system by automatically sending a control message to CPU 330 to initialize the data protocol code. The remaining portion of the call setup sequence is as described above for a data call originated at PC51. When the connection is complete, the data communication between source and destination continues until one party terminates the call at which time the call is broke down as described above for a data call originated by PC51.

CALLS TO AND FROM ADJUNCT TELEPHONE STATION SET

The processing of originating voice and data calls from adjunct telephone station set T51 is similar to voice and data calls originated from PC51. The only significant difference is that data calls can be originated only when bypass switches 301 are in the direct connect mode and also that the originating stimulus is generated by adjunct telephone station set T51 and routed by phone DLI 320 to HDLC device 325 where it is stored for retrieval by CPU 330. CPU 330 appends the appropriate header and message count bytes to these call origination messages then forwards them to interrupt service routine 212. Interrupt service routine 212 forwards the received S1 channel (for voice originated calls) control messages to memory 208 and application interface 213 for communication management application 210. Communication management application 210 updates the screen on PC51 to indicate the call origination status of adjunct telephone station set T51. The processing of the remainder of this originated call is identical to that described above for calls originated from PC51.

Incoming voice or data calls to adjunct telephone station set T51 are processed identically to incoming calls for PC51 as described above. The only difference is that data calls can be received only when bypass switches 301 are in the direct connect mode between the business communication system and the adjunct telephone station set T51.

INTEGRATED CALLING DIRECTORY APPLICATION

The communication management apparatus described above can be used with various application processes to provide various business communication services to the user of digital telephone station set T51 and personal computer PC51. The subject application is an integrated calling directory feature which is implemented as a software process on personal computer PC51. A conceptual illustration of this feature is shown on FIG. 2 where the communication management application 210 communicates with directory process 216 over interprocess communication path 217. The directory process 216 is a software routine described below that provides integrated directory services to the user of personal computer PC51. Directory process 216 is invoked by the user by way of control commands passed to communication management application 210 from the keyboard of personal computer PC51.

CALL MANAGEMENT DISPLAY

FIG. 11 illustrates a communication management display that appears on the screen of personal computer PC51. This call management display is an emulation in pictorial form of the buttons and functions of digital telephone station set T51. The screen illustrated on FIG. 11 is divided into four windows labeled 1111–1114. The first of these windows, 1111, encompasses the top portion of the screen and illustrates two columns of button designation labeled F1 to F0. The button designations F1 to F0 represent the line appearance and function buttons normally found on digital telephone station set T51. The left-hand column of button designations F1 through F9 represent four line appearances F1 to F7 which are multiple appearances of extension 4479. An can be seen from FIG. 11, the designation "IDLE" appears to the right of the call appearances, to indicate that these line appearances are idle. Button F9 represents the data line associated with digital telephone station set T51 which is extension 6248. The letter D which appears after the extension number for button F9 indicates that this is a data line. The busy/idle designation "ACTIVE" which appears after the D associated with button F9 indicates that this line is presently active and the user has dialed a computer using this line appearance for PC51. Function buttons F2, F4, F6, F8 and F0 represent feature buttons that are found on digital telephone station set T51. Thse feature buttons indicate the standard functions that can be performed by a single button push on a digital telephone station set. Just below window 1111 is a horizontal line of characters running from the left side to the right side of the screen to delimit the next two windows which are windows 1112 and 1113. Window 1112 represents a number of additional feature/function keys that can be activated on a typical digital telephone station set such as T51. The designations for these ten buttons are AF1 to AF0. The letter A indicates that these functions are activated by depressing the ALT button on the terminal keyboard of personal computer PC51 while concurrently depressing an associated function key F1 to F0 which appears on the keyboard of personal computer PC51. Thus, if the user at personal computer PC51 wishes to activate the send all calls feature the user would depress the ALT key while also depressing the F3 function key to activate the AF3 function of send all calls. In similar fashion, window 1113 illustrates a calling directory arrangement which displays ten entries labeled SF1 to SF0. The user at personal computer PC51 would activate the SHIFT key while concurrently depressing one of the function buttons F1 to F0 to select one of the directory entries illustrated in window 1113. The operation of this feature will be discussed in further detail below. The remaining window is 1114 which illustrates a directory entry and search menu which the user can activate as will be discussed below.

FUNCTIONAL DESCRIPTION OF CALLING DIRECTORY FUNCTION

Figure 12:
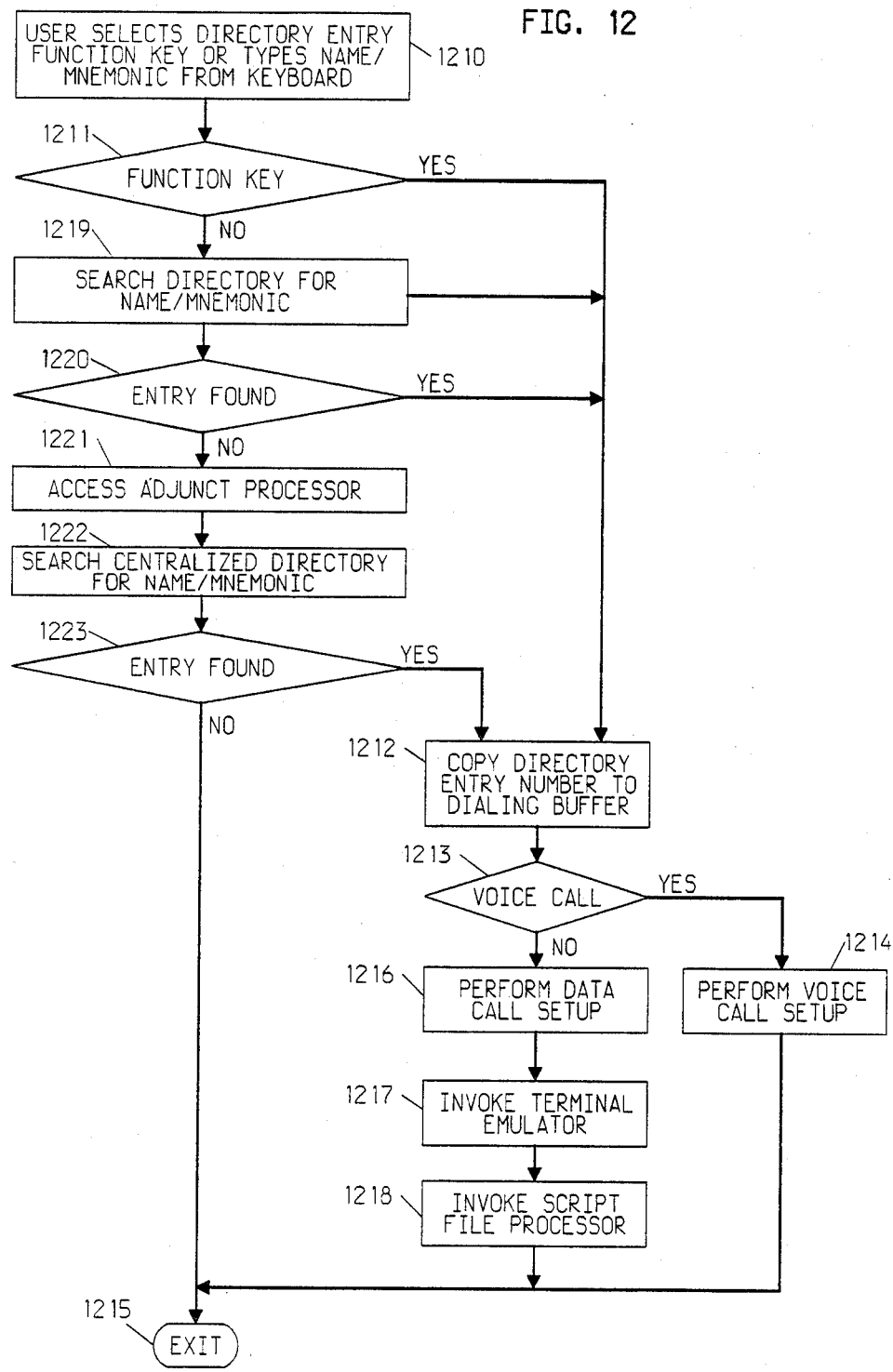
FIG. 12 illustrates in flowchart form the operation of the calling directory apparatus.

FIG. 12 illustrates in flowchart form the directory process 216. The first step in directory process 216 is labeled as step 1210 on FIG. 12. This first step indicates that the user selects a directory entry function key or types a name/mnemonic from the keyboard. This indicates that the user at personal computer PC51, while viewing the display illustrated on FIG. 11, can either select one of the function keys illustrated in window 1113 to select a particular called party from the list of ten destinations shown on FIG. 11 or type in a separate name or mnemonic description of a called party from the keyboard, which entry would appear in window 1111 directly following the identifier "IDLE:" which appears to the right of the selected call appearance. Once the user selects either a directory entry or types in an entry from the keyboard, directory process 216 enters step 1211 where directory process 216 makes a determination whether the user has activated one of the ten function keys or has directly entered a new called party designation from the keyboard. Assume for the moment that the user has selected function key SF3. Directory process 216 identifies the activation of function key SF3 and control in directory process 216 flows to step 1212 where directory process 216 copies the directory entry number from memory associated with the called party designated by function key SF3 into a dialing buffer (not shown). Directory process 216 has stored therein a correspondence between the called party O.L. AUER designated by function key SF3 and a dial string which, when outpulsed to the business communication system, causes a communication connection to be established from personal computer PC51 to the indentified called party. Directory process 216 advances to step 1213 once the directory entry dial string is placed in the dialing buffer. Step 1213 entails directory process 216 making a determination whether this is a voice call or a data call. If this were a voice call, directory process 216 would advance to step 1214 and perform a voice call setup as is described above. Once the voice call is established, directory process 216 exits at step 1215. In the present example it is assumed that this call is not a voice call but is a data call. Directory process 216 advances to step 1216 to perform data call setup. This process is also described above but will be summarized here. The call setup function for a data call involves steps 1217 and 1218. In step 1217, directory process 216 invokes the terminal emulator software. The data module-to-data module "handshaking" of the low levels of the data protocol is handles as described above by DCP interface card 201, in the discussion of data call origination from personal computer PC51 to a computer connecter to another port circuit on business communication system. The terminal emulator software is invoked once the preliminary handshaking is accomplished and processes the higher levels of the data protocol. These levels are typically called the presentation layer and include positioning the cursor on the screen and determining the video screen attributes. Directory process 216 also invokes script file processor in step 1218 which takes the script file associated with the directory entry of SF3 and uses that to establish a communication connection to the called party. Once this communication connection is established, directory process 216 exits at step 1215.

In the case at step 1211 where the user at personal computer PC51 has not depressed a function key but instead has typed in an entry from the keyboard of personal computer PC51, directory process 216 proceeds to step 1219. Directory process 216 in step 1219 searchs the directory stored on personal computer PC51 to match typed entry from the keyboard of personal computer PC51 with the the entry stored in memory. The search can be by typed name or a mnemonic, which is an abbreviation used to identify a called party. This abbreviation can be an acronym or an identification of the particular status or function of the called party. Thus, for example, typing "guard" as a mnemonic could be translated by personal computer PC51 into a request for a call connection to the security organization of the particular company for which the user at personal computer PC51 works. Directory process 216 upon locating an entry in memory that corresponds to the typed entry from the keyboard of personal computer PC51 branches at step 1220 to step 1212 to perform the call establishment function as described above. If no entry corresponding to the typed entry from the keyboard of personal computer PC51 is located, directory process 216 exits at step 1215 and returns control to the user.

DIRECTORY EDITING

FIG. 13 illustrates the screen used by the user of personal computer PC51 to create or edit directory entries. This screen is invoked by the user selecting the directory edit function from the screen illustrated in FIG. 11. This is accomplished by activating the ALT button on the keyboard and operating the E key on the keyboard which corresponds to the first letter of the function EDIT DIR to identify edit directory. In the arrangement illustrated herein window 1114 contains on the very bottom from left to right a menu of various functions that can be performed. These functions are labeled SEARCH, CLEAR, ALLDIR, PHONE, MESSAGE, LOG, EDIT DIR, OTHER. Each function is accessed by operating the ALT key on the keyboard while concurrently operating the key corresponding to the first letter of the function identified in the bottom line of window 1114. Thus, the user at personal computer PC51 would activate the edit directory function by concurrently operating the ALT and E keys on the keyboard of personal computer PC51. Once the user operates these keys, directory process 216 erases windows 1112, 1113, 1114 and instead presents to user with window 1312 as illustrated on FIG. 13. Window 1312 is a directory editing window which contains identifiers of the various elements of data that are required to create a directory entry. The first line of window 1312 is prompted for the user to enter the name, group identification and designation of voice or data call corresponding to a new directory entry. Thus, the called party's name and an identification of the particular organization or group with which they are associated are entered on the first line of window 1312. On the right hand side of the first line of window 1312 is a question prompt for the user to designate whether a call originated from personal computer PC51 to this identified destination would be a voice call or a data call. This enables personal computer PC51 to perform data call setup using stock terminal emulator and script file processing when the destination identified in this particular directory entry is a computer. The second line of window 1312 contains a prompt labeled "number" which indicates the place where the user should enter the dial string required to contact the called party. In addition a prompt labeled "dialing mnemonic" is shown on the second line which permits the user to designate a shorthand version of the called party's identification. The third line of window 1312 contains a prompt labeled "address" which provides a place for the user to enter a mailing address for the called party. The fourth line of window 1312 contains the prompt "electronic mail address" which permits the user to designate an electronic mail box on a destination computer to which electronic mail messages can be transmitted by personal computer PC51 for receipt by the designated user. The fifth line of window 1312 contains the prompt "comment" and provides the user with space to enter specific comments concerning the called party which may be pertinent to the user when calling up this directory entry. These comments could be customer contact information or personal information concerning the called party which the user wishes to remember and have available when the directory entry associated with the called party is called forth. At the bottom of window 1312 is again located a list of menu items which the user can invoke by simply concurrently depressing the ALT key on the keyboard of personal computer PC51 as well as the first letter of the function designation in window 1312. The left most entry in the bottom line of window 1312 is EDIT DIR which indicates the current mode of directory process 216. This entry indicates to the user that the edit directory function has been invoked and directory process 216 is awaiting data entry for all of the elements illustrated in window 1312. The user can terminate the edit directory function by simply activating another of the listed functions.

CENTRALIZED DIRECTORY

If a directory search fails in the local PC directory, a centralized corporate directory residing on another adjunct processor attached to the business communication system is searched. This search can be performed in either of two ways described below.

First, the directory process 216 on personal computer PC 51 emulates a human user of the centralized corporate directory. That is, directory process 216 dials up the attached adjunct processor (not shown) (step 1221) and performs the login procedure required of the adjunct processor. The PC directory process 216 then invokes a directory search process on the attached adjunct processor (step 1222) (not necessarily the same directory search process the human user would invoke) which searches the centralized corporate directory database using the name/mnemonic originally supplied by the PC user. When a match is found by the directory search process (step 1223), the telephone number associated with the name/mnemonic is available to the PC directory process 216 to dial the called party as described above. This approach requires no change to the business communication system software. Directory process 216 on personal computer PC51 simply "dials up" the adjunct processor via the business communication system switching network and performs processor-to-processor data transfer.

An alternative approach to the problem of searching a centralized corporate directory is to enhance the DCP S-channel message set to include two new messages. One S-channel message allows the PC directory process 216 to send the business communication system the name/mnemonic to be searched in the centralized corporate directory. This is accomplished by transmitting the name/mnemonic to be searched as an S-channel message (step 1221) to the business communication system, system processor 100 as described above. The system processor 100 in response to this S-channel message accesses the adjunct processor and uses the received name/mnemonic to retrieve the called party identification associated with the received name/mnemonic (step 1222). A second message is sent by system processor 100 to PC 51 which contains the number associated the previously sent name/mnemonic in the centralized corporate directory. This approach has two strong advantages: (1) user response time is faster since there is no requirement to dial-up the adjunct processor that the centralized corporate directory resides on; (2) with appropriate modifications in the DCP S-channel message set and the business communications system software, the centralized corporate directory search could be requested in an identical way by PC directory process 216 on any centralized directory arrangement on the business communication system. Thus, the centralized directory can be located on an adjunct processor or even in system processor 100. It is also immaterial to directory process 216 how the adjunct processor is converted to system process 100. Directory process 216 simply passes control of the directory search to system processor 100 via the S-channel messages.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a business communication system which serves a plurality of terminal devices, each of which is connected to the business communication system by an associated port circuit, said business communication system including at least one centralized calling directory file for storing a list of called parties and their telephone numbers, calling directory apparatus associated with one of said terminal devices for automatically originating a call through said business communication system to a called party designated by a user at said one terminal device comprising:

processing means;
means interposed between said one terminal device, its corresponding port circuit and also connected to said processing means for connecting said processing means to both said port circuit and said one terminal device;

calling directory file means in said processing means for storing a list of called parties and their associated telephone numbers;

means in said processing means responsive to said user entering the name of said called party into said one terminal device for sequentially scanning said calling directory file means and said centralized calling directory using said name of the called party to obtain the telephone number of said called party;

means in said processing emans for originating a communication connection to said called party via said connecting means in response to said scanning means locating the name of said called party;

adjunct processing means conntect to said business communication system via one of said port circuits for storing a centralized list of called parties and their associated telephone numbers;

means in said originating means responsive to said scanning means failing to locate an entry in said calling directory file means corresponding to said name of the called party for establishing a communication connection to said adjunct processing means via said connecting means; and means in said originating means responsive to said communication connection for querying said adjunct processing means to obtain the telephone number associated with said name of the called party from said centralized list.

2. The system of claim 1 wherein said originating means includes:

means responsive to said querying means for placing a telephone call to said called party using the telephone number obtained by said querying means from said centralized list.

3. The system of claim 1 wherein said business communication system includes a system processor connected to said port circuits, said calling directory system further comprising:

means in said system processor for storing a centralized list of called parties and their associated telephone numbers; and means in said originating means, responsive to said scanning means failing to locate an entry in said calling directory file means corresponding to said name of the called party, for querying said system processor via said connecting means and said port circuit to obtain the telephone number associated with said name of the called party from said centralized list.

4. The system of claim 1 wherein said business communication system includes a system processor connected to said port circuits which stores a centralized list of called parties and their associated telephone numbers, said calling directory system further comprising:

means in said originating means, responsive to said scanning means failing to locate an entry in said calling directory file means corresponding to said name of the called party, for querying said system processor via said connecting means and said port circuit to obtain the telephone number associated with said name of the called party from said centralized list.

5. The system of claim 3 or 4 wherein said originating means includes:

means responsive to said querying means for placing a telephone call to said called party using the telephone number obtained by said querying means from said centralized list.

6. The system of claim 1 further comprising:

means in said originating means responsive to said scanning means for placing a telephone call to said called party using the telephone number obtained by said scanning means from said calling directory file means.

7. In a business communication system which serves a plurality of terminal devices, each of which is connected to the business communication system by an associated port circuit, said business communication system including at least one centralized calling directory file for storing a list of called parties and their telephone numbers, calling directory apparatus associated with one of said terminal devices for automatically originating a call through said business communication system to a called party through said business communication system to a called party designated by a user at said one terminal device comprising:

processing means;

means interposed between said one terminal device, its corresponding port circuit and also connected to said processing means for connecting said processing means to both said port circuit and said terminal device;

calling directory file means in said processing means for storing a list of called parties and their associated telephone numbers;

means in said processing means responsive to said use entering a mnemonic identifier associated with said called party into said one terminal device for sequentially scanning said calling directory file means and said centralized calling directory using said mnemonic identifier to obtain the telephone number of said called party;

means in said processing means for originating a communication connection to said called party via said connecting means in response to said scanning means locating the name of said called party;

adjunct processing means connected to said business communication system via one of said port circuits for storing a centralized list of mnemonic identifiers associated with called parties and their associated telephone numbers;

means in said originating means responsive to said scanning means failing to locate an entry in siad calling directory file means corresponding to said mnemonic identifier associated with said called party for establishing a communication connection to said adjunct processing means via said connecting means; and means in said originating means responsive to said communication connection for querying said adjunct processing means to obtain the telephone number associated with said mnemonic identifier associated with said called party from said centralized list.

8. The system of claim 1 wherein said originating means includes:

means responsive to said querying means for placing a telephone call to said called party using the telephone number obtained by said querying means from said centralized list.

9. The system of claim 7 wherein said business communication system includes a system processor connected to said port circuits, said calling directory system further comprising:

means in said system processor storing a centralized list of mnemonic identifiers associated with called parties and their associated telephone numbers; and means in said originating means, responsive to said scanning means failing to locate an entry in said calling directory file means corresponding to said mnemonic identifier associated with said called party, for querying said system processor via said connecting means and said port circuit to obtain the telephone number associated with said mnemonic identifier associated with said called party from said centralized list.

10. The system of claim 7 wherein said business communication system includes a system processor connected to said port circuits which stores a centralized list of called parties and their associated telephone numbers, said calling directory system further comprising:

means in said originating means, responsive to said scanning means failing to locate an entry in said calling directory file means corresponding to said mnemonic identifier associated with said called party, for querying said system processor via said connecting means and said port circuit to obtain the telephone number associated with said mnemonic identifier associated with said called party from said centralized list.

11. The system of claims 9 or 10 wherein said originating means includes:

means responsive to said querying means for placing a telephone call to said called party using the telephone number obtained by said querying means from said centralized list.

12. The system of claim 7 further comprising:

means in said originating means responsive to said scanning means for placing a telephone call to said called party using the telephone number obtained by said scanning means from said calling directory file means.

13. In a business communication system which serves a plurality of terminal devices, each of which is connected to the business communication system by an associated port circuit, said business communication system including at least one centralized calling directory file for storing a list of called parties and their associated telephone numbers, at least one of said terminal devices having calling directory apparatus interposed between said one terminal device and said business communication system a calling directory method for automatically originating a call through said business communication system to a called party designated by a user at said one terminal device comprising the steps of:

sequentially scanning, in response to the entry of the name of said called party into said one terminal device, the calling directory file of said calling directory apparatus and said centralized calling directory to obtain the telephone number associated with said name of said called party; and originating a communication connection from said one terminal device to said called party using said telephone number obtained from said calling directory file.

* * * * *